(12) United States Patent
Ishibashi et al.

(10) Patent No.: US 10,432,101 B2
(45) Date of Patent: Oct. 1, 2019

(54) POWER CONVERSION APPARATUS

(71) Applicant: Mitsubishi Electric Corporation, Chiyoda-ku (JP)

(72) Inventors: Takaharu Ishibashi, Chiyoda-ku (JP); Takushi Jimichi, Chiyoda-ku (JP); Kimiyuki Koyanagi, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/307,103

(22) PCT Filed: Jun. 14, 2017

(86) PCT No.: PCT/JP2017/021916
§ 371 (c)(1),
(2) Date: Dec. 4, 2018

(87) PCT Pub. No.: WO2018/029975
PCT Pub. Date: Feb. 15, 2018

(65) Prior Publication Data
US 2019/0229632 A1   Jul. 25, 2019

(30) Foreign Application Priority Data

Aug. 10, 2016  (JP) ................. 2016-157412

(51) Int. Cl.
*H02M 3/335* (2006.01)
*H02M 1/34* (2007.01)
*H02M 1/08* (2006.01)

(52) U.S. Cl.
CPC ......... *H02M 3/33576* (2013.01); *H02M 1/08* (2013.01); *H02M 1/34* (2013.01); *H02M 2001/346* (2013.01)

(58) Field of Classification Search
CPC ............ H02M 3/22; H02M 3/24; H02M 3/28; H02M 3/285; H02M 3/325; H02M 3/335;
(Continued)

(56) References Cited

U.S. PATENT DOCUMENTS

| 3,675,110 A | * | 7/1972 | Kelley, Jr. ............... H02M 1/12 363/50 |
| 5,027,264 A | | 6/1991 | DeDoncker et al. |

(Continued)

FOREIGN PATENT DOCUMENTS

| EP | 3 276 809 A1 | 1/2018 |
| JP | 2000-262068 A | 9/2000 |

(Continued)

OTHER PUBLICATIONS

International Search Report dated Jul. 11, 2017 in PCT/JP2017/021916 filed Jun. 14, 2017.

(Continued)

*Primary Examiner* — Adolf D Berhane
(74) *Attorney, Agent, or Firm* — Oblon, McClelland, Maier & Neustadt, L.L.P.

(57) ABSTRACT

A first bridge circuit includes a first leg and a second leg. The first leg includes an upper arm and a lower arm. The upper arm includes a plurality of switching devices connected in series, a plurality of freewheeling diodes connected in antiparallel with the switching devices, respectively, and a plurality of snubber capacitors connected in parallel with the switching devices, respectively. A control circuit controls the first and second bridge circuits such that a dead time period is provided between a turn-on period of an upper arm and a turn-on period of a lower arm included in each of the first and second legs, in each of the first and second bridge circuits.

16 Claims, 12 Drawing Sheets

(58) Field of Classification Search
CPC ......... H02M 3/33507; H02M 3/33515; H02M 3/33576; H02M 3/33584; H02M 1/08; H02M 1/34; H02M 2001/346
See application file for complete search history.

(56) References Cited

U.S. PATENT DOCUMENTS

| | | | |
|---|---|---|---|
| 5,781,419 A * | 7/1998 | Kutkut | H02M 3/33569 363/132 |
| 10,122,367 B1 * | 11/2018 | Albertini | H03L 7/0807 |
| 2003/0095424 A1 | 5/2003 | Oates | |
| 2005/0012473 A1 | 1/2005 | Samejima et al. | |
| 2009/1059622 | 3/2009 | Shimada et al. | |
| 2013/0343089 A1 | 12/2013 | Gupta et al. | |
| 2014/0354074 A1 | 12/2014 | Sadakata et al. | |
| 2017/0363698 A1 * | 12/2017 | Lin | G01R 33/3852 |
| 2018/0138826 A1 * | 5/2018 | Jimichi | H02M 1/32 |
| 2019/0097544 A1 * | 3/2019 | Albertini | H02M 3/33592 |

FOREIGN PATENT DOCUMENTS

| | | |
|---|---|---|
| JP | 2003-528562 A | 9/2003 |
| JP | 2005-39877 A | 2/2005 |
| JP | 2014-87134 A | 5/2014 |
| JP | 2014-103708 A | 6/2014 |
| JP | 2015-12750 A | 1/2015 |
| JP | 2015-527032 A | 9/2015 |
| WO | WO 2013/136755 A1 | 9/2013 |
| WO | 2016/152366 A1 | 9/2019 |

OTHER PUBLICATIONS

Extended European Search Report issued in corresponding European Application No. 17839050.6 dated Jul. 2, 2019.

* cited by examiner

POWER CONVERSION APPARATUS

TECHNICAL FIELD

The present invention relates to a power conversion apparatus for converting a DC power into a DC power, more specifically to a power conversion apparatus with input and output of a DC high voltage.

BACKGROUND ART

Conventionally, in a power conversion apparatus for converting a DC power into a DC power, a bridge circuit is configured with semiconductor switching devices (hereinafter referred to as "switching devices"). The bridge circuit converts a DC power into an AC power or converts an AC power into a DC voltage. A power conversion apparatus with a primary side and a secondary side isolated from each other is built by using two bridge circuits and connecting the AC terminals of the two bridge circuits through a transformer. Some power conversion apparatuses for performing high-efficient DC/DC conversion employ soft switching techniques using snubber capacitors for switching devices (for example, see U.S. Pat. No. 5,027,264 (PTL 1)).

Electric power transmission systems using high-voltage direct current (which hereinafter may be referred to as HVDC) have been developed for achieving higher efficiency of electric power transmission systems. A high voltage is input to or output from a power conversion apparatus used in such HVDC electric power transmission systems. In this case, the voltage value has to be equal to or lower than the breakdown voltage of the switching devices in view of reliability. In order to handle a voltage equal to or higher than the breakdown voltage of a switching device alone, it has been proposed that a power conversion apparatus is configured by connecting a plurality of switching devices in series (for example, see Japanese Patent Laying-Open No. 2000-262068 (PTL 2) and Japanese Unexamined Patent Application Publication (Translation of PCT Application) No. 2003-528562 (PTL 3)).

CITATION LIST

Patent Literature

PTL 1: U.S. Pat. No. 5,027,264
PTL 2: Japanese Patent Laying-Open No. 2000-262068
PTL 3: Japanese Unexamined Patent Application Publication (Translation of PCT Application) No. 2003-528562

SUMMARY OF INVENTION

Technical Problem

U.S. Pat. No. 5,027,264 that describes a DC/DC conversion circuit does not teach connecting a plurality of switching devices in series to increase the voltage. Therefore, the DC voltage value of input/output of the DC/DC conversion circuit is set only to be equal to or lower than the breakdown voltage of a single switching device. This limits the maximum voltage to about half the breakdown voltage in view of reliability. For example, the highest breakdown voltage of a commonly used switching device is 6.5 kV. When such a device is used, the maximum voltage of the DC/DC conversion circuit is limited to about half of 6.5 kV, that is, about 3.3 kV. In other words, the maximum DC voltage that can be handled by the DC/DC conversion circuit is about 3.3 kV.

Japanese Patent Laying-Open No. 2000-262068 describes a power conversion apparatus in which voltage-driven semiconductor devices are connected in series. This power conversion apparatus requires an overvoltage determination circuit, a re-ON circuit for the semiconductor device, a re-ON stop circuit for the semiconductor device, a reset circuit for discharging gate voltage, and a timer circuit for delaying the ON operation of the semiconductor device for a certain period of time. This configuration thus requires a large number of components. Resistors and snubber capacitors are connected in parallel with the semiconductor devices to suppress overvoltage when the turn-on timings differ. In this configuration, when the semiconductor devices turn on, the snubber capacitors discharge electric power through the resistors, leading to increase in loss.

Japanese Unexamined Patent Application Publication (Translation of PCT Application) No. 2003-528562 discloses a bridge circuit in which a plurality of switching devices are connected in series in each arm and snubber capacitors are connected to all the switching devices. In this bridge circuit, the resonant frequency of the resonant circuit connected to the output node is matched with the on/off frequency of the switching devices, thereby preventing a sudden voltage increase in the vicinity of the switching devices. However, since the switching devices that can handle a high voltage usually take time for on/off switching, it is difficult to increase the on/off frequency of the switching devices. Therefore, the resonant frequency of the resonant circuit connected to the output node has to be set to be low. The resonant frequency of the resonant circuit connected to the output node is inversely proportional to each of a capacitive element and an inductive element that constitute the resonant circuit. Therefore, the lower the resonant frequency is, the larger resonant circuit is required, leading to size increase and cost increase of the power conversion apparatus per se. Moreover, it is difficult to perfectly match the resonant frequency with the on/off frequency of the switching devices. If the on/off frequency does not match the resonant frequency, discharge current of the snubber capacitors flows into the switching devices when the switching devices switch from off to on in a state in which the snubber capacitors connected in parallel are charged, resulting in loss. Since the impedance of the path through which the discharge current of the snubber capacitors flows into the switching devices is generally low, the discharge current is excessive for the switching devices to reduce the reliability of the switching devices.

The present invention is made in order to solve the problem described above and is aimed to provide a power conversion apparatus for converting a DC power into a DC power, in which a DC voltage equal to or higher than a device breakdown voltage can be input/output without increasing loss.

Solution to Problem

A power conversion apparatus according to the present invention converts a first DC power into a second DC power. The power conversion apparatus includes a first bridge circuit on the first DC power side, a second bridge circuit on the second DC power side, a transformer, and a control unit. The transformer has a primary-side winding connected to the first bridge circuit and a secondary-side wiring connected to the second bridge circuit. Each of the first bridge circuit and the second bridge circuit includes a first leg and a second leg connected between a positive-electrode power supply line and a negative-electrode power supply line. Each of the first leg and the second leg includes an upper arm and a lower arm connected in series between the positive-electrode power supply line and the negative-electrode power supply line. Each of the upper arm and the lower arm includes a plurality of semiconductor switching devices connected in series and a plurality of snubber capacitors respectively connected in parallel with the semiconductor switching devices. The controller controls the bridge circuit corresponding to the first leg and the second leg such that a dead time period is provided between a turn-on period of the upper arm and a turn-on period of the lower arm included in the first leg and between a turn-on period of the upper arm and a turn-on period of the lower arm included in the second leg.

Advantageous Effects of Invention

According to the present invention, a plurality of semiconductor switches connected in series are provided in each of the upper arm and the lower arm, and a snubber capacitor is connected to each semiconductor switch. Thus, the power conversion apparatus can handle a high voltage equal to or higher than the breakdown voltage of a single semiconductor switching device.

DESCRIPTION OF EMBODIMENTS

Exemplary embodiments of a power conversion apparatus, a control method, and a control apparatus will be described in detail below in conjunction with the figures. It should be noted that the invention disclosed here is not limited by the embodiments. The embodiments can be combined as appropriate without contradicting the processing. The same or corresponding parts are denoted by the same reference signs and a description is not repeated.

First Embodiment

In a first embodiment, a description will be given of a power conversion apparatus including two single-phase full-bridge converters, each including an upper arm and a lower arm each including two switching devices connected in series, and a single-phase transformer for converting a DC power into a DC power.

Figure 1:
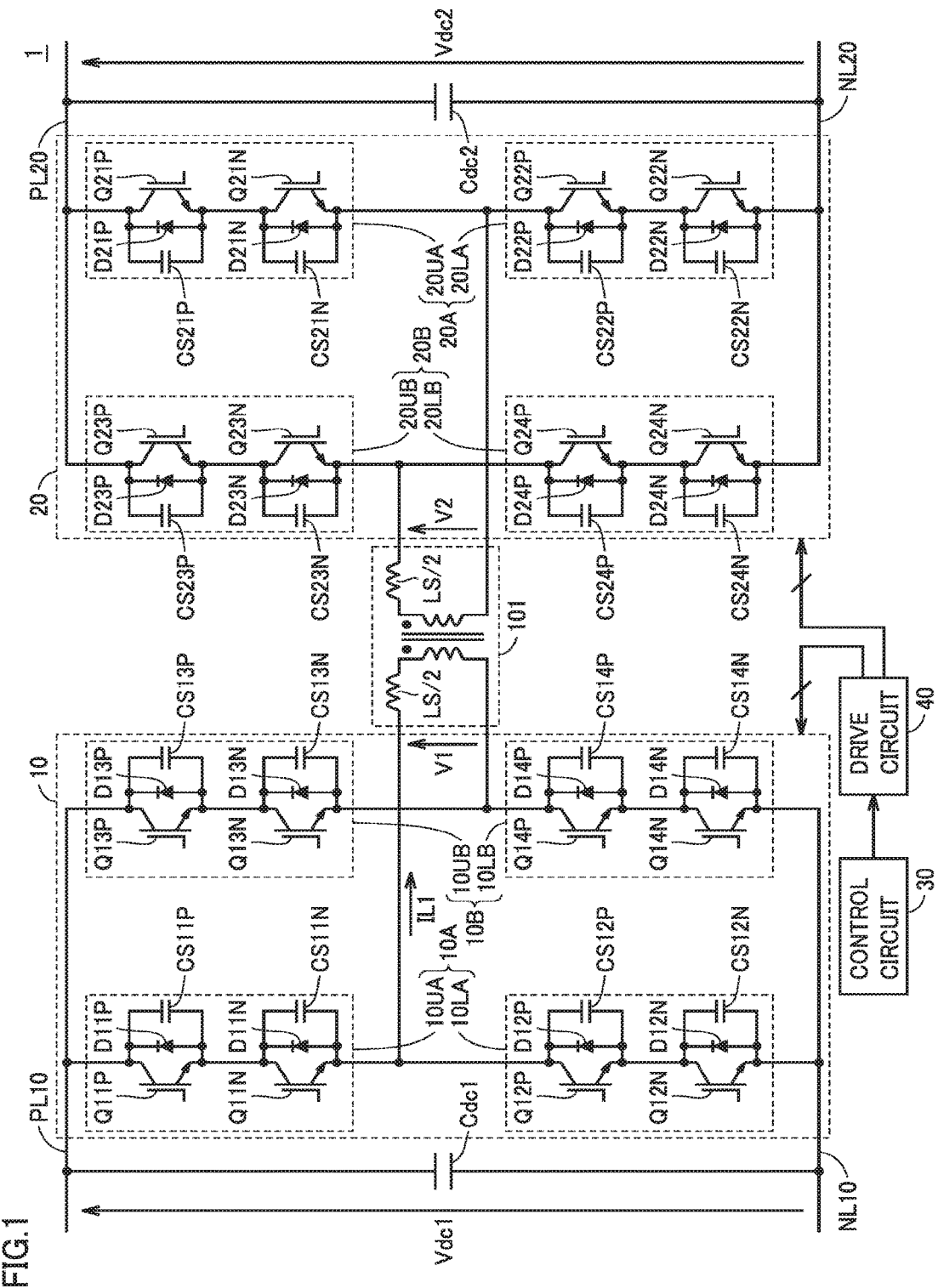
FIG. 1 is a circuit diagram showing an example of the main circuit configuration of a power conversion apparatus according to a first embodiment of the present invention.

FIG. 1 is a circuit diagram showing an example of the main circuit configuration of a power conversion apparatus according to the first embodiment of the present invention. The configuration shown in FIG. 1 is only illustrative and any DC/DC conversion apparatus having a bridge circuit falls within the scope of the present invention.

Referring to FIG. 1, a power conversion apparatus 1 performs power conversion between power supply lines PL10, NL10 and power supply lines PL20, NL20. Power conversion apparatus 1 includes bridge circuits 10, 20, which are single-phase full-bridge circuits, a transformer 101, a drive circuit 40 outputting drive signals to bridge circuits 10, 20, and a control circuit 30 for controlling bridge circuits 10, 20 through drive circuit 40.

Power conversion apparatus 1 is a circuit for converting a DC voltage Vdc1 applied to a primary-side capacitor Cdc1 into a DC voltage to be applied to a secondary-side capacitor Cdc2 through switching devices, freewheeling diodes, and a transformer. Here, for convenience of explanation, the capacitor Cdc1 side is the primary side and the capacitor Cdc2 side is the secondary side, with transformer 101 interposed therebetween. The power conversion apparatus in FIG. 1 is capable of free power conversion between the primary side and the secondary side, and the direction in which electric power is transmitted can be freely controlled.

Transformer 101 has the primary-side coil connected to bridge circuit 10 and the secondary-side coil connected to bridge circuit 20. Each of bridge circuits 10, 20 includes a first leg and a second leg connected between the positive-electrode power supply line and the negative-electrode power supply line. Specifically, bridge circuit 10 includes a leg 10A and a leg 10B connected between positive-electrode power supply line PL10 and negative-electrode power supply line NL10.

Leg 10A includes an upper arm 10UA and a lower arm 10LA connected in series between positive-electrode power supply line PL10 and negative-electrode power supply line NL10. Upper arm 10UA includes switching devices Q11P, Q11N connected in series, freewheeling diodes D11P, D11N connected in antiparallel with switching devices Q11P, Q11N, respectively, and snubber capacitors CS11P, CS11N connected in parallel with switching devices Q11P, Q11N, respectively. Lower arm 10LA includes switching devices Q12P, Q12N connected in series, freewheeling diodes D12P, D12N connected in antiparallel with switching devices Q12P, Q12N, respectively, and snubber capacitors CS12P, CS12N connected in parallel with switching devices Q12P, Q12N, respectively.

Leg 10B includes an upper arm 10UB and a lower arm 10LB connected in series between positive-electrode power supply line PL10 and negative-electrode power supply line NL10. Upper arm 10UB includes switching devices Q13P, Q13N connected in series, freewheeling diodes D13P, D13N connected in antiparallel with switching devices Q13P, Q13N, respectively, and snubber capacitors CS13P, CS13N connected in parallel with switching devices Q13P, Q13N, respectively. Lower arm 10LB includes switching devices Q14P, Q14N connected in series, freewheeling diodes D14P, D14N connected in antiparallel with switching devices Q14P, Q14N, respectively, and snubber capacitors CS14P, CS14N connected in parallel with switching devices Q14P, Q14N, respectively.

On the other hand, bridge circuit 20 includes a leg 20A and a leg 20B connected between positive-electrode power supply line PL20 and negative-electrode power supply line NL20.

Leg 20A includes an upper arm 20UA and a lower arm 20LA connected in series between positive-electrode power supply line PL20 and negative-electrode power supply line NL20. Upper arm 20UA includes switching devices Q21P, Q21N connected in series, freewheeling diodes D21P, D21N connected in antiparallel with switching devices Q21P, Q21N, respectively, and snubber capacitors CS21P, CS21N connected in parallel with switching devices Q21P, Q21N, respectively. Lower arm 20LA includes switching devices Q22P, Q22N connected in series, freewheeling diodes D22P, D22N connected in antiparallel with switching devices Q22P, Q22N, respectively, and snubber capacitors CS22P, CS22N connected in parallel with switching devices Q22P, Q22N, respectively.

Leg 20B includes an upper arm 20UB and a lower arm 20LB connected in series between positive-electrode power supply line PL20 and negative-electrode power supply line NL20. Upper arm 20UB includes switching devices Q23P, Q23N connected in series, freewheeling diodes D23P, D23N connected in antiparallel with switching devices Q23P, Q23N, respectively, and snubber capacitors CS23P, CS23N connected in parallel with switching devices Q23P, Q23N, respectively. Lower arm 20LB includes switching devices Q24P, Q24N connected in series, freewheeling diodes D24P, D24N connected in antiparallel with switching devices Q24P, Q24N, respectively, and snubber capacitors CS24P, CS24N connected in parallel with switching devices Q24P, Q24N, respectively.

Control circuit 30 controls bridge circuits 10, 20 such that a dead time period is provided between the turn-on period of the upper arm and the turn-on period of the lower arm included in the first leg and between the turn-on period of the upper arm and the turn-on period of the lower arm included in the second leg, in each of bridge circuits 10, 20.

Inductance LS in FIG. 1 is leakage inductance of transformer 101, and LS/2 is disposed equivalently on each of the primary-side and the secondary side. The leakage inductance of transformer 101 is not necessarily used for inductance LS, and additional inductance may be connected.

On the primary-side, both ends of each of leg 10A and leg 10B are connected to capacitor Cdc1. The midpoint of each of leg 10A and leg 10B is connected to the primary-side of transformer 101.

On the secondary side, both ends of each of leg 20A and leg 20B are connected to capacitor Cdc2. The midpoint of each of leg 20A and leg 20B is connected to the secondary side of transformer 101.

Since the primary-side bridge circuit 10 includes two legs 10A, 10B and the secondary-side bridge circuit 20 includes two legs 20A, 20B, these bridge circuits are commonly called single-phase full-bridge circuit or H bridge circuit.

Here, the voltage sharing by the switching devices connected in series in each arm is determined by the capacitance of the snubber capacitors connected in parallel. When snubber capacitors with equal capacitance are provided, the voltage in each arm is evenly divided between the switching devices.

The control signals for switching devices Q11P, Q11N, . . . Q14P, Q14N, and Q21P, Q21N, . . . Q24P, Q24N in bridge circuits 10, 20 are all different and can be supplied independently. However, it is preferable that some of the switching devices share the same common control signal. Each switching device turns on/off in synchronization with the timing of output voltage of the connected drive circuit. When the on/off timings of the switching devices connected in series in each arm vary, voltage may be concentrated in one of the devices and overvoltage may be applied. It is therefore preferable that the output timings of drive circuit 40 that applies drive voltage to the switching devices connected in series in each arm are matched.

The power conversion apparatus in FIG. 1 is a circuit that converts a DC voltage into an AC voltage, ensures insulation through transformer 101, and converts the AC voltage into a DC voltage. If insulation is unnecessary, only inductance equivalent to LS may be connected.

In FIG. 1, electrolytic capacitors or film capacitors may be used for capacitors Cdc1 and Cdc2. Film capacitors are preferred because high-frequency current flows through capacitors Cdc1 and Cdc2. The use of film capacitors can increase the life of the power conversion apparatus.

Voltage-driven switching devices such as IGBTs (Insulated-Gate Bipolar Transistor) and MOSFETs (Metal-Oxide-Semiconductor Field-Effect Transistors) are used for switching devices Q11P, Q11N, . . . Q24P, Q24N. In the switching devices, a plurality of switching devices may be connected in parallel in accordance with current capacity.

The turns ratio of transformer 101 is preferably matched with the ratio between the primary-side DC voltage Vdc1 and the secondary-side DC voltage Vdc2. For example, when the input voltage is 3 kV and the output voltage is 6 kV, the turns ratio of transformer 101 is 1:2. In the following description, the secondary-side DC voltage Vdc2 is calculated in terms of the primary side using the turns ratio of the transformer.

Drive circuit 40 includes, as a component, a photocoupler receiving a signal from control circuit 30 for driving the gate terminals of the semiconductor switching devices while keeping the insulated state between control circuit 30 and the semiconductor switching devices. In the following, it is assumed that the turn-on/turn-off timings of the switching devices connected in series in each arm are perfectly matched by making adjustment such that the response time of the photocoupler as a component of drive circuit 40 is free from variations due to individual difference of the component or by adding a circuit to drive circuit 40 for matching the output timings of drive circuit 40.

Figure 2:
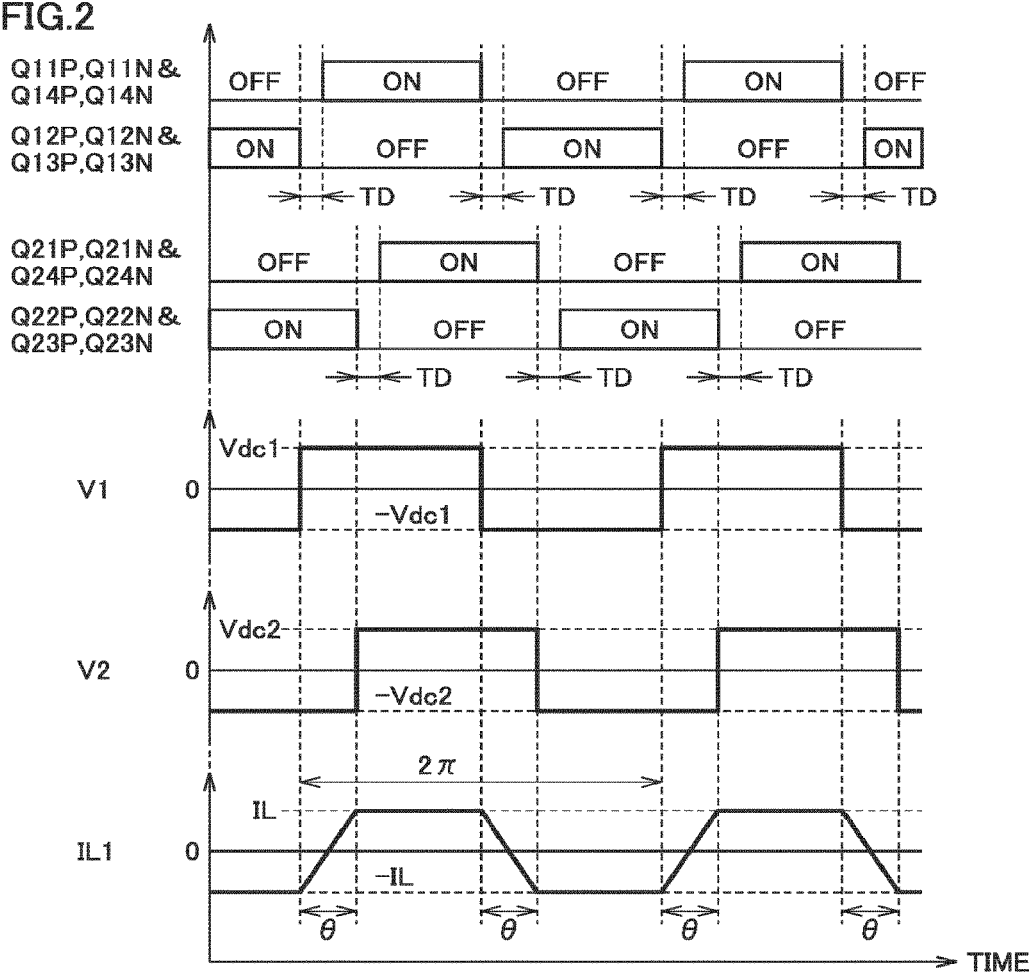
FIG. 2 is a waveform diagram for explaining the circuit operation of the power conversion apparatus.

Electric power P to be transmitted from the primary side to the secondary side can be controlled by controlling the on/off of switching devices Q11P, Q11N, . . . Q14P, Q14N and Q21P, Q21N, . . . Q24P, Q24N. FIG. 2 is a waveform diagram illustrating the circuit configuration of the power conversion apparatus. FIG. 2 shows the on/off states of switching devices Q11P, Q11N, . . . Q14P, Q14N and Q21P, Q21N, . . . Q24P, Q24N, and output voltages V1, V2 of the primary-side and secondary-side single-phase full-bridge circuits, and the primary-side output current IL'.

In the primary-side bridge circuit 10, switching devices Q11P, Q11N and Q14P, Q14N operate in the same switching state, and switching devices Q12P, Q12N and Q13P, Q13N operate in the same switching state. The group of switching devices Q11P, Q11N and Q14P, Q14N and the group of switching devices Q12P, Q12N and Q13P, Q13N do not simultaneously turn on. Ideally, the groups turn on/off complementarily by 180 degrees for one cycle (360 degrees). In other words, the group of switching devices Q11P, Q11N and Q14P, Q14N and the group of switching devices Q12P, Q12N and Q13P, Q13N perform inverse operations.

Similarly, in the secondary-side bridge circuit 20, switching devices Q21P, Q21N and Q24P, Q24N operate in the same switching state, and switching devices Q22P, Q22N and Q23P, Q23N operate in the same switching state. The group of switching devices Q21P, Q21N and Q24P, Q24N and the group of switching devices Q22P, Q22N and Q23P, Q23N do not simultaneously turn on. Ideally, the groups turn on/off complementarily by 180 degrees for one cycle (360 degrees). In other words, the group of switching devices Q21P, Q21N and Q24P, Q24N and the group of switching devices Q22P, Q22N and Q23P, Q23N perform inverse operations.

More specially, dead time TD is inserted for preventing capacitors Cdc1, Cdc2 from short-circuiting because of characteristic variations of the switching devices and variations in control circuit 30 or drive circuit 40 when the switching devices change from off to on. Here, the dead time means a period in which all the switching devices are off in bridge circuit 10 as for the primary side and means a period in which all the switching devices are off in bridge circuit 20 as for the secondary side.

Switching is effectuated with the phases shifted by a phase difference θ [rad] between the primary-side bridge circuit 10 and the secondary-side bridge circuit 20. In the period of this phase difference, output current IL1 of the primary-side bridge circuit 10 changes into a current waveform as illustrated in FIG. 2. That is, transmitted power P can be controlled by controlling current IL1 with this phase difference θ. Here, electric power P transmitted from the primary side to the secondary side can be obtained by Formula (1) below, where co is the value obtained by multiplying the switching frequency fsw by 2π.

$$P=(Vdc1-Vdc2)/(\omega LS)\cdot[\theta-(\theta^2/\pi)] \quad (1)$$

Figure 3:
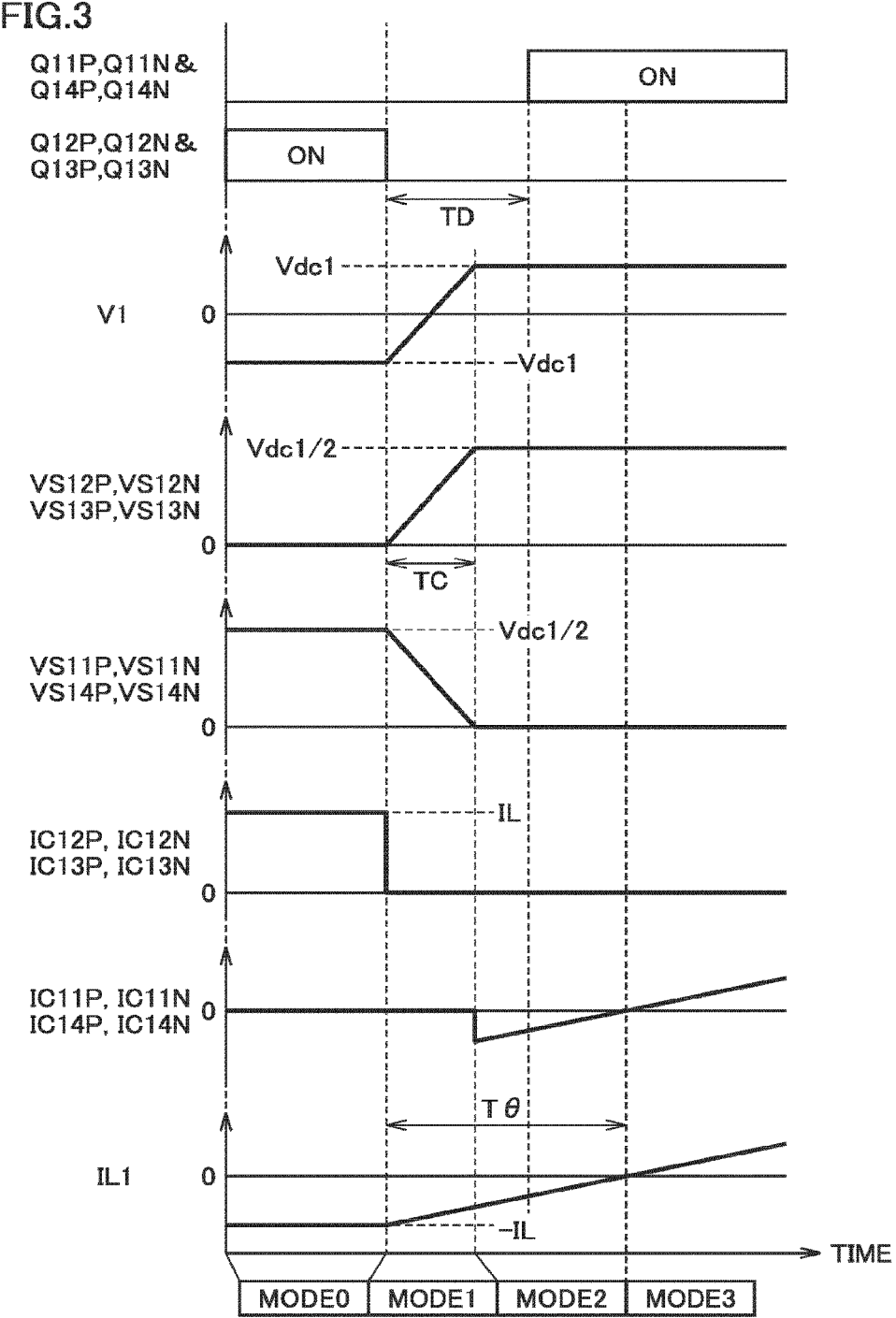
FIG. 3 is a partially enlarged diagram of FIG. 2 with the end-to-end voltage of switching devices.

Next, zero voltage switching or ZVS (Zero-Voltage Switching), which is the feature of the main circuit of the power conversion apparatus, will be described. FIG. 3 is a partially enlarged diagram of FIG. 2 with end-to-end voltages of the switching devices.

FIG. 3 shows the waveforms, focusing on the change in switching state of the primary-side bridge circuit 10. FIG. 3 shows the switching state of switching devices Q11P, Q11N, Q14P, Q14N, the switching state of switching devices Q12P, Q12N, Q13P, Q13N, output voltage V1 of bridge circuit 10, end-to-end voltages VS12P, VS12N and VS13P, VS13N, end-to-end voltages VS11P, VS11N and VS14P, VS14N, currents IC12P, IC12N and IC13P, IC13N, currents IC11P, IC11N and IC14P, IC14N, and output current TL1 of bridge circuit 10, from the top.

End-to-end voltages VS11P, VS11N and VS14P, VS14N are the voltages between the ends of switching devices Q11P, Q11N and switching devices Q14P, Q14N, respectively.

End-to-end voltages VS12P, VS12N and VS13P, VS13N are the voltages between the ends of switching devices Q12P, Q12N and switching devices Q13P, Q13N, respectively.

Currents IC11P, IC11N and IC14P, IC14N are currents flowing through switching devices Q11P, Q11N and switching devices Q14P, Q14N and freewheeling diodes D11P, D11N and freewheeling diodes D14P, D14N, respectively. Positive current flows through the switching devices, and negative current flows through the freewheeling diodes.

Currents IC12P, IC12N and IC13P, IC13N are currents flowing through switching devices Q12P, Q12N and switching devices Q13P, Q13N and freewheeling diodes D12P, D12N and freewheeling diodes D13P, D13N. Also in this case, positive current flows through the switching devices, and negative current flows through the freewheeling diodes.

Although FIG. 3 shows a state of power transmission from the primary side to the secondary side, embodiments are not limited to this power transmission direction. In FIG. 3, the state in which switching devices Q11P, Q11N and switching devices Q14P, Q14N are off and switching devices Q12P, Q12N and switching devices Q13P, Q13N are on is the initial state (MODE 0).

Starting from this state, while switching devices Q11P, Q11N and switching devices Q14P, Q14N are kept off, switching devices Q12P, Q12N and switching devices Q13P, Q13N turn off (MODE 1). It is noted that although switching devices Q12P, Q12N and switching devices Q13P, Q13N can be cut off immediately, end-to-end voltages VS12P, VS12N, VS13P, VS13N gradually rise under the effect of snubber capacitors CS12P, CS12N, CS13P, CS13N. At the same time, snubber capacitors CS11P, CS11N, CS14P, CS14N are discharged, and end-to-end voltages VS11P, VS11N, VS14P, VS14N gradually decrease due to this effect (MODE 1).

Figure 4:
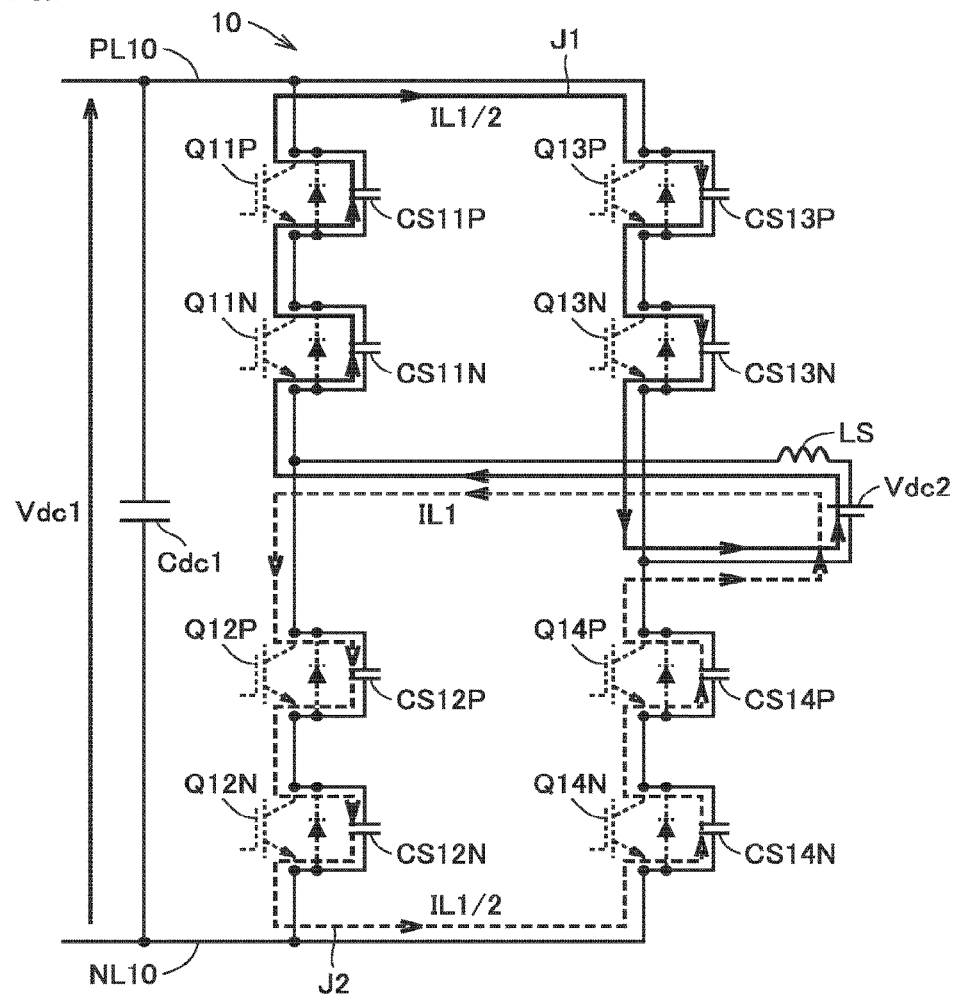
FIG. 4 is a diagram showing a current path of a primary-side bridge circuit 10 in MODE 1 in FIG. 3.

FIG. 4 is a diagram showing a current path of primary-side bridge circuit 10 in MODE 1 in FIG. 3. During MODE 1, all the switching devices in bridge circuit 10 are in the off state, and current is split into a path J1 and a path J2.

Since the impedances of path J1 and path J2 are equal, IL1 equally splits into path J1 and path J2. Therefore, the charge/discharge current of the snubber capacitor is ½ of IL1 at the end of MODE 0. In FIG. 4, the total inductance is denoted by LS, and the output voltage of the secondary-side bridge circuit 20 is simulated by Vdc2. Finally, end-to-end voltages VS12P, VS12N, VS13P, VS13N rise to Vdc1/2, and end-to-end voltages VS11P, VS11N, VS14P, VS14N decrease to almost zero. Here, almost zero means zero or a voltage drop caused by current passing through the switching devices.

Here, current split into path J1 and path J2 is current determined by the resonance of inductance LS and the snubber capacitors. Since the resonance of inductance LS and the snubber capacitors occurs only during a dead time, the resonant frequency of the resonant circuit formed of inductance LS and the snubber capacitors is irrelevant to the switching frequency. Therefore, the resonant frequency can be set high relative to the switching frequency, and the size of inductance LS and the snubber capacitors can be reduced.

When end-to-end voltages VS11P, VS11N, VS14P, VS14N decrease to almost zero, negative current flows through freewheeling diodes D11P, D11N, D14P, D14N as the polarity of IL1 is negative (MODE 2). During MODE 2, switching devices Q11P, Q11N, Q14P, Q14N turn on. At this point of time, snubber capacitors CS11P, CS11N, CS14P, CS14N have already been discharged, and although switching devices Q11P, Q11N, Q14P, Q14N turn on, their end-to-end voltages VS11P, VS11N, VS14P, VS14N are almost zero. That is, since switching devices Q11P, Q11N, Q14P, Q14N turn on with almost zero end-to-end voltages VS11P, VS11N, VS14P, VS14N, turn-on loss does not occur. ZVS therefore can reduce switching loss.

That is, a more efficient power conversion apparatus can be configured by determining the capacitance of the snubber capacitors such that charge/discharge time TC of the snubber capacitors is shorter than dead time TD.

When current IL1 increases and the polarity changes from negative to positive, current flowing through freewheeling diodes D11P, D11N, D14P, D14N comes to flow through switching devices Q11P, Q11N, Q14P, Q14N.

The first embodiment is characterized in that it includes snubber capacitors set such that the snubber capacitor charge/discharge time TC is shorter than dead time TD, and time TO taken for the polarity of output current IL1 of the primary-side bridge circuit 10 to change is longer than dead time TD. Time TO required for the polarity of output current IL1 to change is determined by phase difference θ that controls the transmitted power P. That is, when the transmitted power P is small, time TO becomes short and approaches dead time TD. Here, given that when the transmitted power P is small, phase difference θ is also small, Formula (1) can be approximated by Formula (2) below.

$$P \approx (Vdc1 - Vdc2)/(\omega LS) \cdot \theta \quad (2)$$

Based on Formula (2), time Tθ taken for the polarity of output current IL1 to change when the transmitted power P is small can be obtained by Formula (3) below.

$$T\theta = (\tfrac{1}{2}) \cdot (P \cdot LS)/(Vdc1 - Vdc2) \quad (3)$$

Here, when the transmitted power P of power conversion apparatus 1 is, for example, half the rated power or smaller than half the rated power, inductance LS is set to satisfy the condition shown by Formula (4) so that time TO taken for the polarity of output current IL1 to change is longer than dead time TD.

$$LS \geq [(2 \cdot Vdc1 \cdot Vdc2)/P] \cdot TD \quad (4)$$

In Formula (4) above, there is flexibility in setting the transmitted power P. For example, LS can be set such that time TO taken for the polarity of output current IL1 to change in the vicinity of the average value of transmitted power in actual operation is longer than dead time TD. This can increase the operating time of ZVS operation in the longtime operating state and reduce electric power loss to improve the facility operating ratio.

The charge/discharge time TC of the snubber capacitor also has to be shorter than dead time TD. The snubber capacitor is charged by storing magnetic energy stored in inductance LS into the snubber capacitor as electrostatic energy. Magnetic energy is determined by the relation between flowing current and inductance, and electrostatic energy is determined by charged voltage and capacitance. When the transmitted power P is smaller than the rated power and current is smaller, magnetic energy is also small. On the other hand, the final charge voltage of the snubber capacitor does not change with transmitted power and is DC voltage Vcd1.

The voltage to charge the snubber capacitor is proportional to current determined by charge time TC and magnetic energy and is inversely proportional to capacitance. Therefore, when the magnetic energy for charging decreases, storing the same electrostatic energy into the snubber capacitor increases charge/discharge time TC. Therefore, in order to perform ZVS operation, inductance LS and combined capacitance CS of the snubber capacitors in each arm have to be set such that charge/discharge time TC is equal to or shorter than dead time TD. Combined capacitance CS is set so as to satisfy the condition shown in Formula (5) below.

$$CS \leq [LS/(4Vdc1 \cdot Vdc2)] \cdot \{[(Vdc1+Vdc2)/LS] \cdot TD\}^2 \quad (5)$$

Setting CS that satisfies Formula (5) above achieves ZVS operation and reduces electric power loss to improve the facility operating ratio.

Since zero voltage switching is compatible with higher voltage by series connection of switching devices, the power conversion apparatus can achieve low loss and handle a voltage equal to or higher than the switching device breakdown voltage.

Snubber capacitor capacitance CS shown in Formula (5) above is the total capacitance of snubber capacitors connected in parallel with the switching devices connected in series in each arm. More specifically, if the number of switching devices connected in series in each arm is two, the snubber capacitors having capacitance double the capacitance obtained by Formula (5) are connected. If the capacitances of the snubber capacitors connected in parallel with the switching devices vary, the end-to-end voltages in the off state of the switching devices vary with the capacitance ratio. Therefore, the capacitance variation of the snubber capacitors has to be fall within a range that satisfies the condition that the highest end-to-end voltage of the end-to-end voltages determined by the capacitance ratio of the snubber capacitors is equal to or lower than maximum voltage Vmax permitted by the switching devices.

The operation of electric power transmission by the primary-side bridge circuit 10 has been described above. However, this is applicable to electric power transmission by the secondary-side bridge circuit 20. The snubber capacitor capacitance of bridge circuits 10, 20 receiving electric power also has to satisfy the condition shown by Formula (5).

Although the number of switching devices connected in series in each arm is two in the description above, the number of switching devices is not limited thereto. The number of switching devices connected in series in each arm is determined by DC voltages Vdc1 and Vdc2 and the breakdown voltage of the switching devices used. This is applicable to the following embodiments.

The power conversion apparatus of the first embodiment provides zero voltage switching to simultaneously solve the problem of loss increase due to discharge of the snubber capacitors and the problem of reduction of reliability of the semiconductor switching devices due to excessive discharge current of the snubber capacitors for the semiconductor switching devices. This also solves the problem of significant increase of components because the overvoltage when the turn-off timings differ can be suppressed only by the snubber capacitors. The power conversion apparatus therefore can handle high voltage equal to or higher than the switching device breakdown voltage, with low loss and with high reliability.

Second Embodiment

In the first embodiment, it is assumed that the output timings of drive circuit 40 applying drive voltage to two switching devices connected in series in each arm are matched. However, the photocoupler serving as a component of drive circuit 40 may vary in timing of output voltage because of variations (typically 100 nanoseconds to 500 nanoseconds) due to individual difference. Consequently, the timings of output voltage of drive circuit 40 may vary.

In a switching device with high breakdown voltage, in general, a longer dead time is set since the turning on/turning off takes time. Thus, the variation in timing of output voltage of drive circuit 40 is sufficiently shorter relative to the dead time and less affects output voltage control, etc. However, the timing variation of output voltage of drive circuit 40 may cause application of unacceptable excessive voltage to the switching devices connected in series in each arm, leading to reduction in reliability of the power conversion apparatus.

In the power conversion apparatus of the first embodiment, the turning on does not matter because the voltage has already decreased to almost zero by zero voltage switching (ZVS). On the other hand, as for variation in timing of the turning off of the switching devices, unacceptable excessive voltage is applied to a switching device with early turning-off timing, of the switching devices connected in series in each arm.

In the second embodiment, a power conversion apparatus including snubber capacitors will be described, which suppresses overvoltage caused by varied timings of output voltage of the drive circuit due to individual difference of the component such as photocoupler, while performing zero voltage switching described in the first embodiment. In the second embodiment, the circuit diagram of the main circuit configuration is the same as FIG. 1 and will not be further elaborated here. Snubber capacitors CS11P, CS11N, CS24P, CS24N have capacitance in a range defined by Formula (5) described in the first embodiment in order to achieve zero voltage switching.

Figure 5:
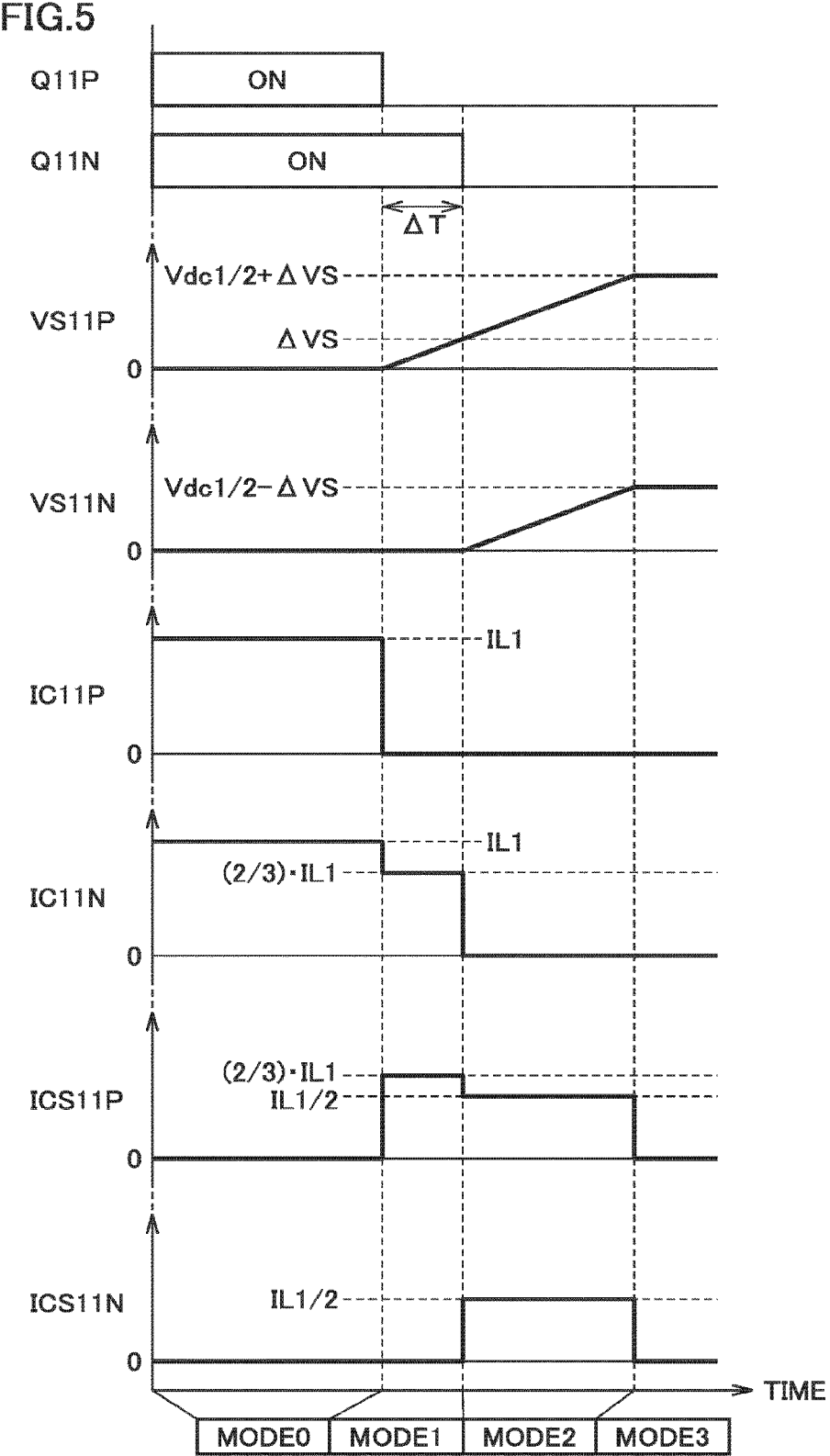
FIG. 5 is a waveform diagram for explaining the operation of a power conversion apparatus according to a second embodiment.

FIG. 5 is a waveform diagram for explaining the operation of the power conversion apparatus according to the second embodiment. FIG. 5 shows waveforms when the turn-on timings differ, as for arm 10UA including Q11P, Q11N in bridge circuit 10.

These waveforms are waveforms in a case where the timings of output of drive voltage applied to Q11P, Q11N in arm 10UA vary by maximum variation time $\Delta T$, and the turn-off timing of Q11N lags behind the turn-off timing of Q11P by $\Delta T$.

FIG. 5 shows the switching state of switching devices Q11P, Q11N, end-to-end voltages VS11P, VS11N, and currents IC11P, IC11N and ICS11P, ICS11N, from the top. End-to-end voltages VS11P, VS11N are voltages between the ends of switching devices Q11P, Q11N, respectively. Currents IC11P, IC11N are current flowing through switching devices Q11P, Q11N and freewheeling diodes D11P, D11N (positive current flows through the switching device, and negative current flows through the freewheeling diode). Currents ICS11P, ICS11N are current flowing through snubber capacitors CS11P, CS11N, respectively. Maximum variation time $\Delta T$ is the maximum value of variation due to individual difference of the component such as photocoupler.

In the initial state (MODE 0), since switching devices Q11P, Q11N are both in the on state and current is positive, current flows through switching devices Q11P, Q11N.

Then in MODE 1, when an off signal is input from control circuit 30 to drive circuit 40, drive circuit 40 outputs voltage for turning off switching devices Q11P, Q11N. At this point of time, timing variation resulting from individual difference of the component such as photocoupler occurs, and the turn-off timing of switching device Q11N lags behind the turn-off timing of switching device Q11P by $\Delta T$. During MODE 1, switching device Q11P turns off, snubber capacitor CS11P connected in parallel is charged, and end-to-end voltage VS11P attains $\Delta VS$.

Figure 6:
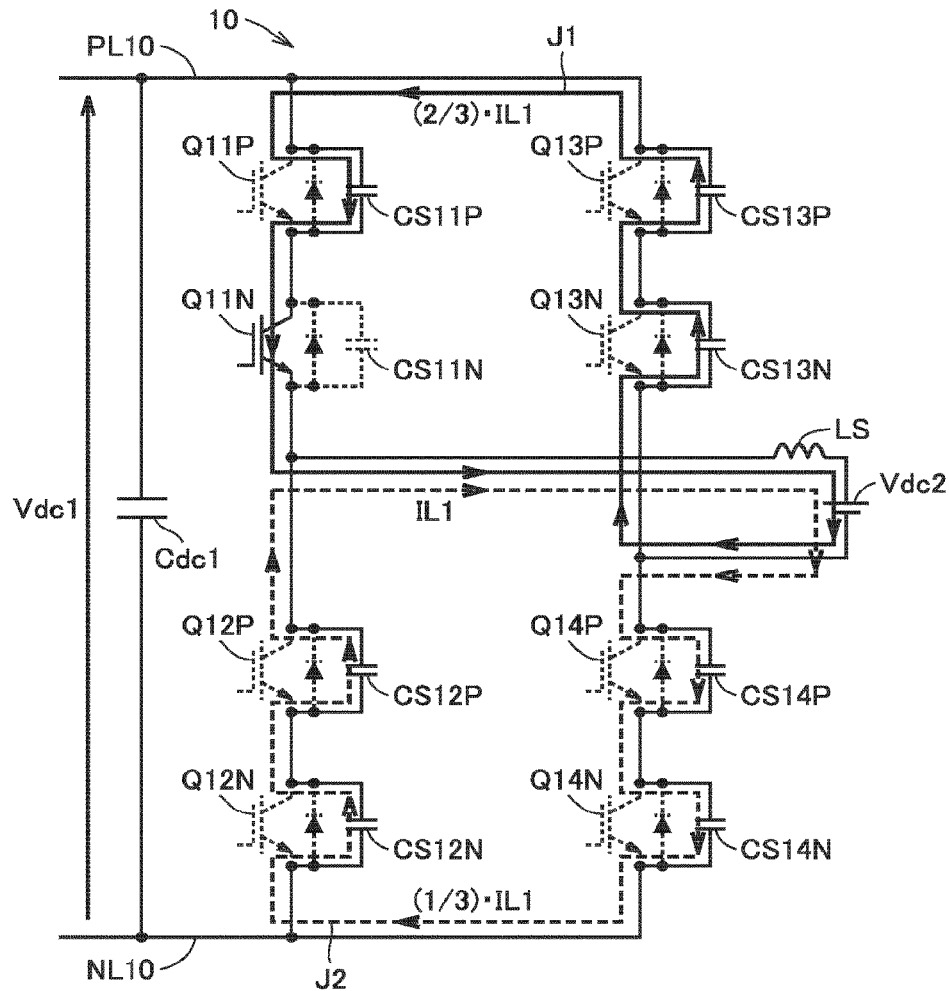
FIG. 6 is a diagram showing a charge path in MODE 1 in FIG. 5.

FIG. 6 is a diagram showing a charge path in MODE 1 in FIG. 5. In path J1, only snubber capacitor CS11P is charged and therefore the impedance does not match between path J1 and path J2, so that current IL1 is not split into ½. In path J2, the snubber capacitors to be charged are CS12P and CS12N, and CS12P and CS12N are connected in series. Thus, charge current ICS11P of snubber capacitor CS11P in MODE 1 is (⅔)·IL1. Then, $\Delta VS$ can be obtained by Formula (6) below. CS' is snubber capacitor capacitance connected in parallel per switching device.

$$\Delta VS = (2/3) \cdot (IL1/CS') \cdot \Delta T \quad (6)$$

In MODE 2, switching device Q11N also turns off and snubber capacitor CS11N is also charged, so that the impedances of path J1 and path J2 become equal and current IL1 is split into ½ in each path. On the other hand, in arm 10LB including Q14P, Q14N, the turn-on timing does not vary and $\Delta VS$ is not produced. In arm 10LA including Q12P, Q12N and arm 10UB including Q13P, Q13N, snubber capacitors CS12P, CS12N, CS13P, CS13N are discharged and zero voltage switching is performed, in the same manner as in the first embodiment.

If the turn-off timings of the switching devices connected in series in each arm do not vary, the end-to-end voltage of each switching device is equally divided, so that the end-to-end voltage of each switching device is equal to the average value obtained by dividing the DC voltage by the number of switching devices in each arm.

On the other hand, when the turn-off timings of the switching devices connected in series in each arm vary by $\Delta T$, the end-to-end voltage of the switching device turning off earlier by $\Delta T$ is higher than the average value by $\Delta VS$. That is, the end-to-end voltage of the switching device turning off earlier is voltage $\Delta VS$ at the time of turning off of the switching device turning off later. In Formula (6), $\Delta VS$ is the largest when IL1 reaches the maximum value and when the transmitted power P is the rated power P(max). At this point of time, if the end-to-end voltage of the switching device exceeds maximum voltage Vmax permitted for the switching device, destruction or operation stop of the power conversion apparatus occurs, leading to reduction of reliability.

In order to construct each arm by connecting a plurality of switching devices in series without reducing the reliability of the power conversion apparatus, capacitance CS' of the snubber capacitor connected in parallel with each switching device need to be set within a range defined by Formula (7) below.

$$CS' \geq [Vmax - (Vdc1/2)]^{-1} \cdot \Delta T \cdot (2/3) \cdot [(Vdc1 + Vdc2)/LS] \cdot TD \quad (7)$$

In Formula (7) above, Vmax can be set flexibly and can be set to an extent that does not impair the reliability of the switching device. In general, it is preferable that Vmax is set to about half the breakdown voltage of the switching device. As described in the first embodiment, the combined capacitance CS of the snubber capacitors in each arm need to be set so as to satisfy Formula (5) in order to perform zero voltage switching.

In the power conversion apparatus of the second embodiment, capacitance CS' of the snubber capacitor connected in parallel with each of the switching devices connected in series in each arm is set within a range that satisfies Formula (7) in order to prevent the end-to-end voltage of the switching device from becoming unacceptable overvoltage because of variation in the turn-off operation resulting from the photocoupler and the like in the drive circuit to reduce the reliability of the power conversion apparatus. Snubber capacitor capacitance CS in each arm is set within a range that satisfies Formula (5) in order to perform zero voltage switching and achieve higher efficiency.

That is, in the power conversion apparatus of the second embodiment, snubber capacitor capacitance set in a range that simultaneously satisfies Formula (5) and Formula (7) is connected in parallel with the switching device in each arm. This increases the operating time of zero voltage switching in the longtime operating state, reduces electric power loss, and improves the reliability of the power conversion apparatus, thereby improving the facility operating ratio.

Since zero voltage switching is compatible with higher voltage by series connection of switching devices, the power conversion apparatus has low loss and can handle a voltage equal to or higher than the switching device breakdown voltage.

Snubber capacitor capacitance CS' shown by Formula (7) above is the capacitance of the snubber capacitor connected in parallel with each of the switching devices connected in series in each arm. That is, if the number of switching devices connected in series in each arm is two, the combined capacitance CS in each arm is ½ of the capacitance defined by Formula (7).

If the capacitances of the snubber capacitors connected in parallel with the switching devices vary, the end-to-end voltages in the off state of the switching devices also vary. This end-to-end voltage is determined by the capacitance ratio of the snubber capacitors. Therefore, the capacitance variation of the snubber capacitors has to fall within a range of capacitance such that the highest end-to-end voltage of the varied end-to-end voltages is equal to or lower than maximum voltage Vmax permitted by the switching devices.

The operation of electric power transmission by bridge circuit 10 has been described above. However, this is applicable to electric power transmission by bridge circuit 20. The snubber capacitor capacitance connected in parallel with the switching device in the single-phase full-bridge circuit receiving electric power is also set so as to simultaneously satisfy the conditions shown in Formula (5) and Formula (7).

In the second embodiment, inductance LS is set in a range that satisfies Formula (4) in the same manner as in the first embodiment.

Third Embodiment

Figure 7:
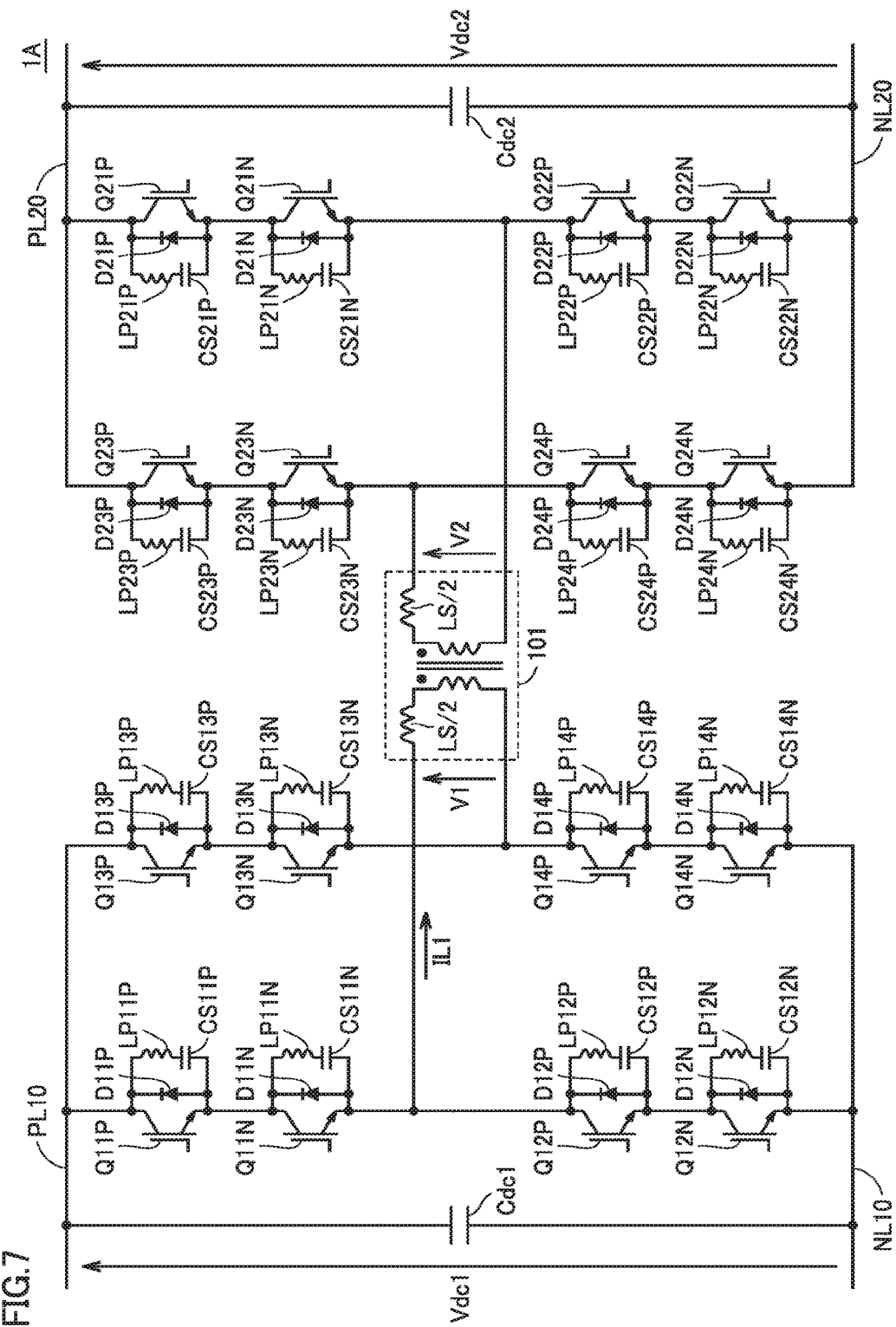
FIG. 7 is a circuit diagram showing the main circuit configuration of a power conversion apparatus 1A of a third embodiment.

FIG. 7 is a circuit diagram showing the main circuit configuration of a power conversion apparatus 1A of a third embodiment. Power conversion apparatus 1A of the third embodiment further includes series inductances LP11P, LP11N, LP24P, LP24N connected in series with snubber capacitors CS11P, CS11N, CS24P, CS24N, in the configuration of power conversion apparatus 1 shown in FIG. 1. Except that the series inductances are connected, the main circuit configuration is equivalent to that of FIG. 1 and will not be further elaborated here.

The series inductance may be parasitic inductance present in each of a snubber capacitor, a semiconductor switching device, and a connection conductor connecting the semiconductor switching device with the snubber capacitor. Alternatively, each snubber capacitor may include a capacitor portion and an inductor portion connected in series with the capacitor portion. In this case, the value of the series inductance is determined by the value of inductance of the inductor portion and the value of parasitic inductance. Even when series inductances are connected to snubber capacitors as in the case of power conversion apparatus 1A of the third embodiment, the transmitted power P can be controlled by turning on/off the switching devices in the same manner as in FIG. 2.

In the case of the configuration as shown in FIG. 1, if the switching device connected in parallel turns on in a state in which voltage remains in the snubber capacitor, overcurrent may flow through the switching device.

Then, in the third embodiment, series inductance is connected to the snubber capacitor to suppress discharge current to equal to or smaller than the maximum current permitted by the switching device even when the switching device connected in parallel with the LC series circuit of the inductance and the snubber capacitor turns on in a state in which voltage remains in the snubber capacitor. This improves the reliability of the power conversion apparatus.

The reason why the series inductances are connected in the third embodiment will be described in more detail below.

In the first embodiment and the second embodiment, the capacitance of the snubber capacitor connected to each switching device is set such that charge/discharge is finished in the dead time period even when the transmitted power P is smaller than the rated power. However, for example, when the transmitted power P is set to the average value in determining the capacitance of snubber capacitor CS, charge/discharge of the snubber capacitor is not finished in the dead time period during transmission of electric power below the average value, so that the switching device turns on with voltage remaining.

Figure 8:
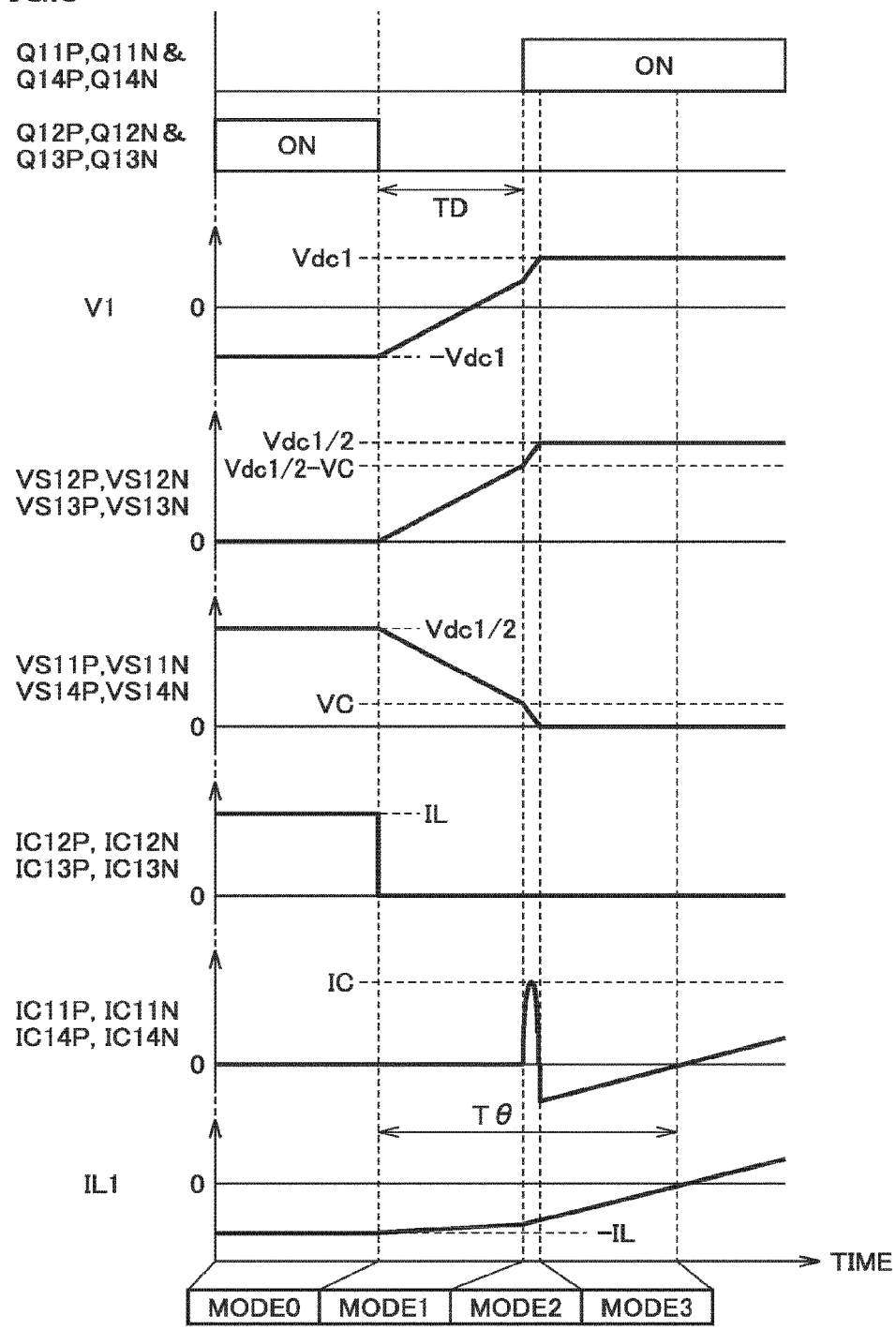
FIG. 8 is a diagram showing the waveforms of bridge circuit 10 when electric power below the average value is transmitted.

FIG. 8 is a diagram showing the waveforms of bridge circuit 10 when electric power below the average value is being transmitted. FIG. 8 shows the switching state of switching devices Q11P, Q11N, Q14P, Q14N, the switching state of switching devices Q12P, Q12N, Q13P, Q13N, output voltage V1 of bridge circuit 10, end-to-end voltages VS12P, VS12N and VS13P, VS13N, end-to-end voltages VS11P, VS11N and VS14P, VS14N, currents IC12P, IC12N and IC13P, IC13N, currents IC11P, IC11N and IC14P, IC14N, and output current IL1 of bridge circuit 10, from the top.

Here, end-to-end voltages VS11P, VS11N and VS14P, VS14N are voltages between the ends of switching devices Q11P, Q11N and switching devices Q14P, Q14N, respectively. End-to-end voltages VS12P, VS12N and VS13P, VS13N are voltages between the ends of switching devices Q12P, Q12N and switching devices Q13P, Q13N, respectively.

Currents IC11P, IC11N and IC14P, IC14N are current flowing through switching devices Q11P, Q11N and switching devices Q14P, Q14N and freewheeling diodes D11P, D11N and freewheeling diodes D14P, D14N. Positive current flows through the switching devices, and negative current flows through the freewheeling diodes.

Currents IC12P, IC12N and IC13P, IC13N are current flowing through switching devices Q12P, Q12N and switching devices Q13P, Q13N and freewheeling diodes D12P, D12N and freewheeling diodes D13P, D13N. Also in this case, positive current flows through the switching devices, and negative current flows through the freewheeling diodes.

In the third embodiment, the capacitance in the second embodiment may be applied to the snubber capacitors and the magnitude in the first embodiment may be applied to inductance LS.

In the waveform diagram in FIG. 8, in MODE 0 in the initial state, switching devices Q11P, Q11N and Q14P, Q14N are off, and switching devices Q12P, Q12N and Q13P, Q13N are on.

Starting from this state, in MODE 1, while switching devices Q11P, Q11N and Q14P, Q14N are kept off, switching devices Q12P, Q12N and Q13P, Q13N turn off. In MODE 1, output current IL1 of bridge circuit 10 is divided in the paths shown in FIG. 4, and snubber capacitors CS11P, CS11N, CS14P, CS14N are discharged, and snubber capacitors CS12P, CS12N, CS13P, CS13N are charged.

However, if the transmitted power P is smaller than the set value, the charge/discharge of the snubber capacitors is not finished in dead time TD, and at the end of MODE 1, voltage of VC remains in snubber capacitors CS11P, CS11N, CS14P, CS14N.

Figure 9:
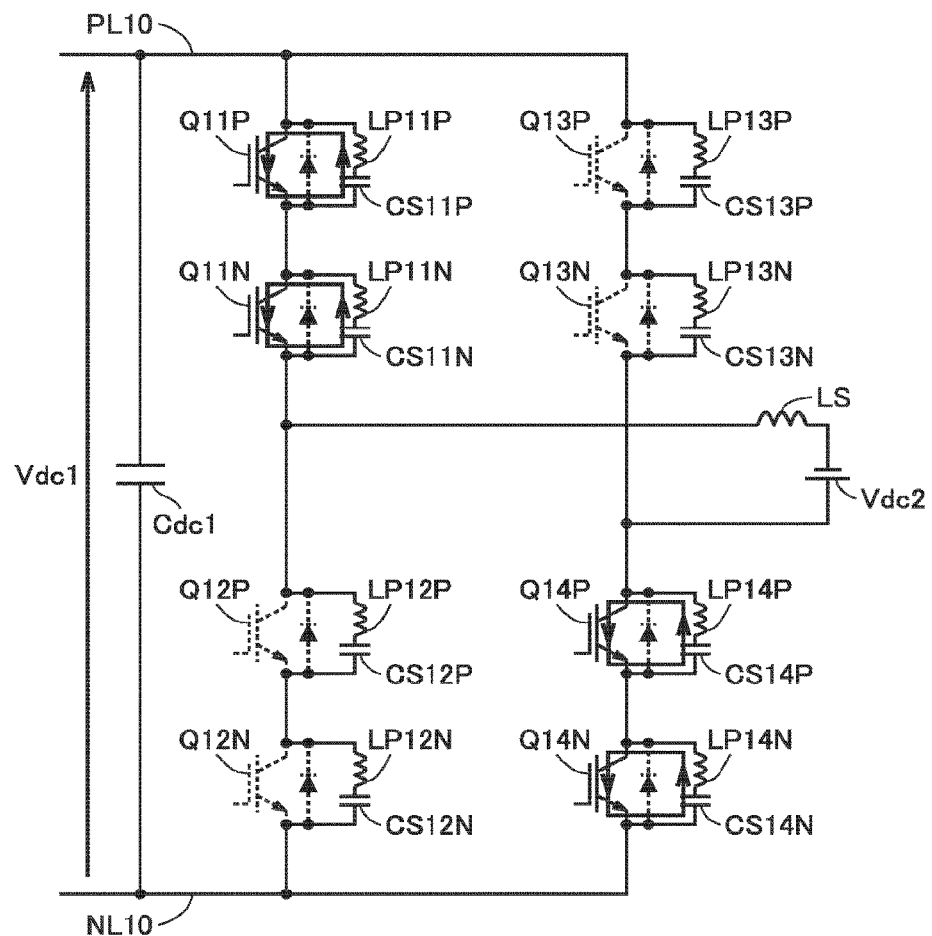
FIG. 9 is a diagram showing the circuit operation in MODE 2 of the power conversion apparatus of the third embodiment.

FIG. 9 is a diagram showing the circuit operation in MODE 2 in the power conversion apparatus of the third embodiment. In FIG. 9, the total inductance is denoted by LS, and the output voltage of bridge circuit 20 is simulated by DC voltage Vdc2.

When switching devices Q11P, Q11N, Q14P, Q14N turn on in a state in which voltage remains by voltage VC in snubber capacitors CS11P, CS11N, CS14P, CS14N, discharge current from snubber capacitors CS11P, CS11N, CS14P, CS14N flows through switching devices Q11P, Q11N, Q14P, Q14N.

Maximum value IC of discharge current from the snubber capacitor into the switching device is inversely proportional to the series inductance and increases in proportion to voltage VC remaining in the snubber capacitor. In general, the snubber capacitor and the switching device are connected such that the impedance is small. Therefore if the switching device turns on in a state in which voltage remains in the snubber capacitor, discharge current so large as to destroy the switching device flows into the switching device in some cases.

The maximum voltage of the switching device is Vmax, and the discharge current from the snubber capacitor into the switching device is largest when this voltage remains in the snubber capacitor. Then, in the third embodiment, in order to prevent the switching device from being destroyed even when turning on in a state in which voltage remains in the snubber capacitor, the series inductance is set so as to satisfy the condition shown in Formula (8) below.

$$LP \geq CS(V\text{max}/I\text{max})^2 \quad (8)$$

In Formula (8), Imax is the maximum permissible current of the switching device and is the value determined by the switching device used. Preferably, series inductance LP is formed of parasitic inductance of the snubber capacitor, the connection conductor connecting the snubber capacitor and the switching device, and the switching device. However, if the value set in Formula (8) is not satisfied, a new inductor may be additionally connected in series with the snubber capacitor.

In order to prevent large current from flowing through the switching device to destroy the switching device when the transmitted power P is smaller than the set value and charge/discharge of the snubber capacitor is not be finished in the dead time, the capacitance of the snubber capacitor may be reduced. However, when the capacity of the snubber capacitor is reduced, the capacitance of the snubber capacitor may be insufficient for suppressing excessive end-to-end voltage of the switching device, produced by variation in turn-on operation of the switching devices due to timing variation of output voltage of the drive circuit.

However, as shown in FIG. 7, even without reducing the capacitance of the snubber capacitor, the problem described above can be solved by connecting a series inductance to the snubber capacitor to suppress discharge current when voltage remains in the snubber capacitor.

That is, since the capacitance of the snubber capacitor can be set using the minimum transmitted power as average power, the operating time of zero voltage switching in the longtime operating state is increased and the power loss is reduced. In addition, the reliability of the power conversion apparatus is improved, leading to improvement of the facility operating ratio. The end-to-end voltage of the switching device is prevented from becoming unacceptable overvoltage because of variation in turn-off operation resulting from the photocoupler or the like in the drive circuit, and discharge current when voltage remains in the snubber capacitor can be suppressed. Therefore, the reliability of the power conversion apparatus is improved.

Accordingly, zero voltage switching is compatible with higher voltage by the series connection of switching devices, and the power conversion apparatus can achieve low loss and handle a voltage equal to or higher than the switching device breakdown voltage.

In the third embodiment, the operation of electrical power transmission by bridge circuit 10 has been described. However, this operation is applicable to electrical power transmission by bridge circuit 20. The series inductance in the single-phase full-bridge receiving electric power is also set to the range that satisfies Formula (8).

In the third embodiment, when the turn-off timings vary because of variation of the drive circuit, the same effect as described above can also be achieved by connecting inductance in series with the snubber capacitor.

Fourth Embodiment

Figure 10:
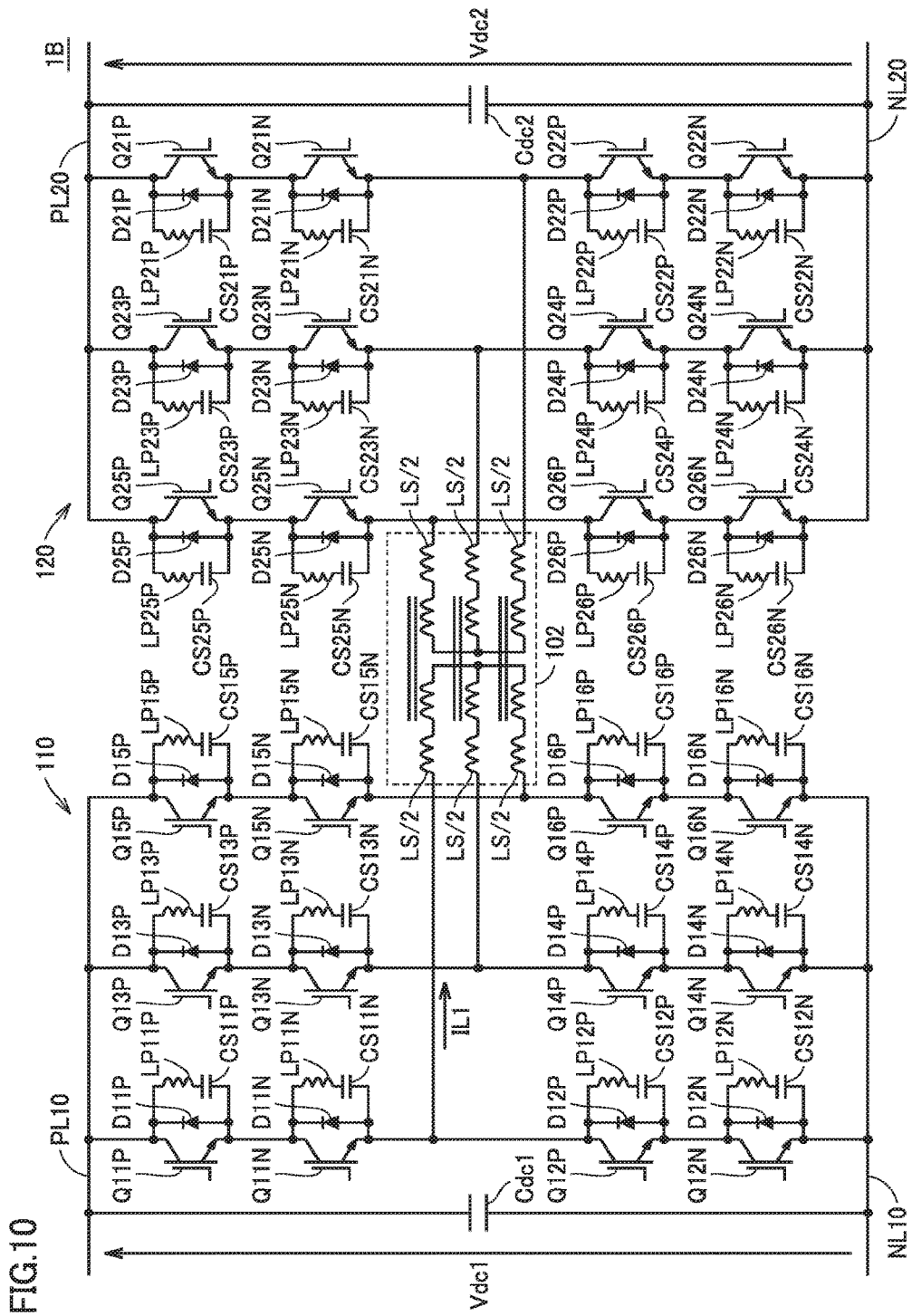
FIG. 10 is a diagram showing the main circuit configuration of a power conversion apparatus according to a fourth embodiment.

FIG. 10 is a diagram showing the main circuit configuration of a power conversion apparatus 1B according to a fourth embodiment. In the fourth embodiment, snubber capacitors and series inductances are employed in a three-phase bridge circuit. Power conversion apparatus 1B includes three-phase bridge circuits 110, 120 and a three-phase transformer 102.

In FIG. 1 and FIG. 7, a single-phase full-bridge circuit is configured with two legs each formed by connecting a series of arms each including a plurality of switching devices connected in series. By contrast, in the fourth embodiment, as shown in FIG. 10, three-phase bridge circuits 110, 120 are each configured with three legs.

That is, three-phase bridge circuit 110 in FIG. 10 further includes switching devices Q15P, Q15N, Q16P, Q16N, and freewheeling diodes D15P, D15N, D16P, D16N and snubber capacitors CS15P, CS15N, CS16P, CS16N pertaining thereto respectively, in the configuration of bridge circuit 10 in FIG. 1.

Three-phase bridge circuit 120 further includes switching devices Q25P, Q25N, Q26P, Q26N, and freewheeling diodes D25P, D25N, D26P, D26N and snubber capacitors CS25P, CS25N, CS26P, CS26N pertaining thereto respectively, in the configuration of bridge circuit 20 in FIG. 1.

Three-phase transformer 102 is used instead of transformer 101, for the use of three-phase bridge circuits 110, 120. Three-phase transformer 102 may not necessarily be three phase, and three single-phase transformers may be used. Although leakage inductance LS is shown in the same manner as in the first embodiment, it may not be the leakage inductance of the transformer and an additional inductance may be used. If insulation is not necessary, only inductance equivalent to LS may be connected.

The use of three-phase bridge circuits can reduce ripple currents flowing through capacitors Cdc1, Cdc2 and thereby reduce the capacitor capacitance, leading to size reduction of the power conversion apparatus. Considering the first and second embodiments, the three-phase bridge circuit including snubber capacitors, inductance LS, and series inductances can achieve further loss reduction and improvement in reliability. The series inductances in the third embodiment may be used as series inductances.

The basic operation of the three-phase bridge circuit is described in the specification of U.S. Pat. No. 5,027,264 or the like and will not be further elaborated here. The transmitted power P is controlled by phase difference θ[rad] between the primary-side and secondary-side switching in the same manner as in the single-phase full-bridge circuit, and Formula (9) below holds.

$$P = (Vdc1 + Vdc2)/(\omega LS) \cdot [(2/3) \cdot \theta - \theta^2/(2\pi)] \quad (9)$$

The use of three-phase bridge circuits also has a similar problem as described in the first to third embodiments involved with the compatibility between higher voltage and zero voltage switching, and similar setting values are effective. More specifically, LS may be set such that time TO in which the polarity of output current is reversed is longer than dead time TD when the transmitted power P is smaller than the rated power, in the same manner as in the first embodiment. In other words, in the three-phase bridge circuit, LS can be set so as to satisfy the condition shown in Formula (10) below.

$$LS \geq (4/3) \cdot [(Vdc1 \cdot Vdc2)/P] \cdot TD \quad (10)$$

In Formula (10), there is flexibility in setting the transmitted power P. For example, inductance LS may be set in the vicinity of the average value of transmitted power in the actual operation. This increases the operating time of ZVS operation in the longtime operating state, reduces the electric power loss, and improves the facility operating ratio.

Charge/discharge time TC of the snubber capacitor has to be shorter than dead time TD. The snubber capacitor is charged/discharged with magnetic energy stored in inductance LS, and as the transmitted power P decreases, magnetic energy decreases, resulting in longer charge/discharge time TC of the snubber capacitor. Therefore, similar to inductance LS, when the transmitted power P is smaller than the rated power, the combined capacitance CS of snubber capacitors in each arm has to be set such that charge/discharge time TC is equal to or shorter than dead time TD. Therefore, the combined capacitance CS is set so as to satisfy the condition shown in Formula (11) below.

$$CS \leq [LS/(4Vdc1 \cdot Vdc2)] \cdot \{[(Vdc1 + Vdc2)/(3LS)] \cdot TD\}^2 \quad (11)$$

Setting the combined capacitance CS that satisfies Formula (11) enables ZVS operation, reduces electric power loss, and improves the facility operating ratio.

Since zero voltage switching is compatible with higher voltage by the series connection of switching devices, the power conversion apparatus can achieve low loss and handle a voltage equal to or higher than the switching device breakdown voltage.

As for the operation when the switching timings of the switching devices connected in series in each arm vary by ΔT, CS11P is charged to ΔVS during the period of ΔT and ΔVS at this point of time is expressed by Formula (6).

If the turn-off timings of the switching devices connected in series in each arm do not vary, voltage between the ends of each switching device is evenly divided, and thus the voltage between the ends of each switching device is equal to the average value obtained by dividing DC voltage by the number of switching devices included in each arm. On the other hand, when the turn-off timings of the switching devices connected in series in each arm vary by ΔT, the end-to-end voltage of the switching device turning off earlier by ΔT is higher than the average value by ΔVS.

In Formula (6), ΔVS is largest when IL1 is the maximum value and when the transmitted power P is the rated power P(max). Here, if the end-to-end voltage of the switching device exceeds the permissible maximum voltage Vmax, destruction or operation stop of the power conversion apparatus occurs to reduce the reliability of the power conversion apparatus. In order to configure each arm by connecting a plurality of switching devices in series without reducing the reliability of the power conversion apparatus, capacitance CS' of the snubber capacitor in the LC series circuit connected in parallel with each switching device need to be set to a range defined by Formula (12) below.

$$CS' \geq [Vmax - (Vdc1/2)]^{-1} \cdot \Delta T \cdot (2/3) \cdot [(Vdc1 + Vdc2)/(3LS)] \cdot TD \quad (12)$$

In Formula (12), Vmax can be set flexibly and can be set to such an extent that does not impair the reliability of the switching device, and desirably set to about half the breakdown voltage of the switching device. As described in the first embodiment, in order to perform zero voltage switching, the combined capacitance CS of snubber capacitors in each arm need to be set to the capacitance that satisfies Formula (11).

In order to prevent the end-to-end voltage of the switching device from becoming unacceptable overvoltage because of variation in turn-off operation resulting from the photocoupler or the like in the drive circuit to reduce the reliability of the power conversion apparatus, in the power conversion apparatus in the fourth embodiment, capacitance CS' of the snubber capacitor in the LC series circuit connected in parallel with each of the switching devices connected in series in each arm is set within a range that satisfies Formula (12). Furthermore, in order to perform zero voltage switching and increase the efficiency, snubber capacitor capacitance CS in each arm is set in a range that satisfies Formula (11).

That is, in power conversion apparatus 1B in the fourth embodiment, the capacitance of the snubber capacitors in the LC series circuit connected in parallel with the switching devices in each arm is set in a range that simultaneously satisfies Formula (11) and Formula (12). This increases the operating time of zero voltage switching in the longtime operating state, reduces the electric power loss, and improves the reliability of the power conversion apparatus, thereby improving the facility operating ratio.

Since zero voltage switching is compatible with higher voltage by series connection of switching devices, the power conversion apparatus achieves low loss and can handle voltage equal to or higher than the switching device breakdown voltage.

Snubber capacitor capacitance CS' shown in Formula (12) above is the capacitance of the snubber capacitor in the LC series circuit connected in parallel with each of the switching devices connected in series in each arm. That is, if the number of switching devices connected in series in each arm is two, the combined capacitance CS in each arm is ½ of the capacitance defined by Formula (12). If the capacitances of the snubber capacitors in the LC series circuits connected in parallel with the switching devices vary, the end-to-end voltages in the off state of the switching devices vary with the capacitance ratio. It is therefore desirable that the capacitances of the snubber capacitors are all equal.

The operation of electric power transmission by the primary-side three-phase full-bridge circuit has been described above. However, this is applicable to electric power transmission by the secondary-side three-phase full-bridge circuit. The snubber capacitor capacitance in the LC series circuit connected in parallel with the switching device in the three-phase full-bridge receiving electric power also has to simultaneously satisfy Formula (11) and Formula (12).

Fifth Embodiment

Figure 11:
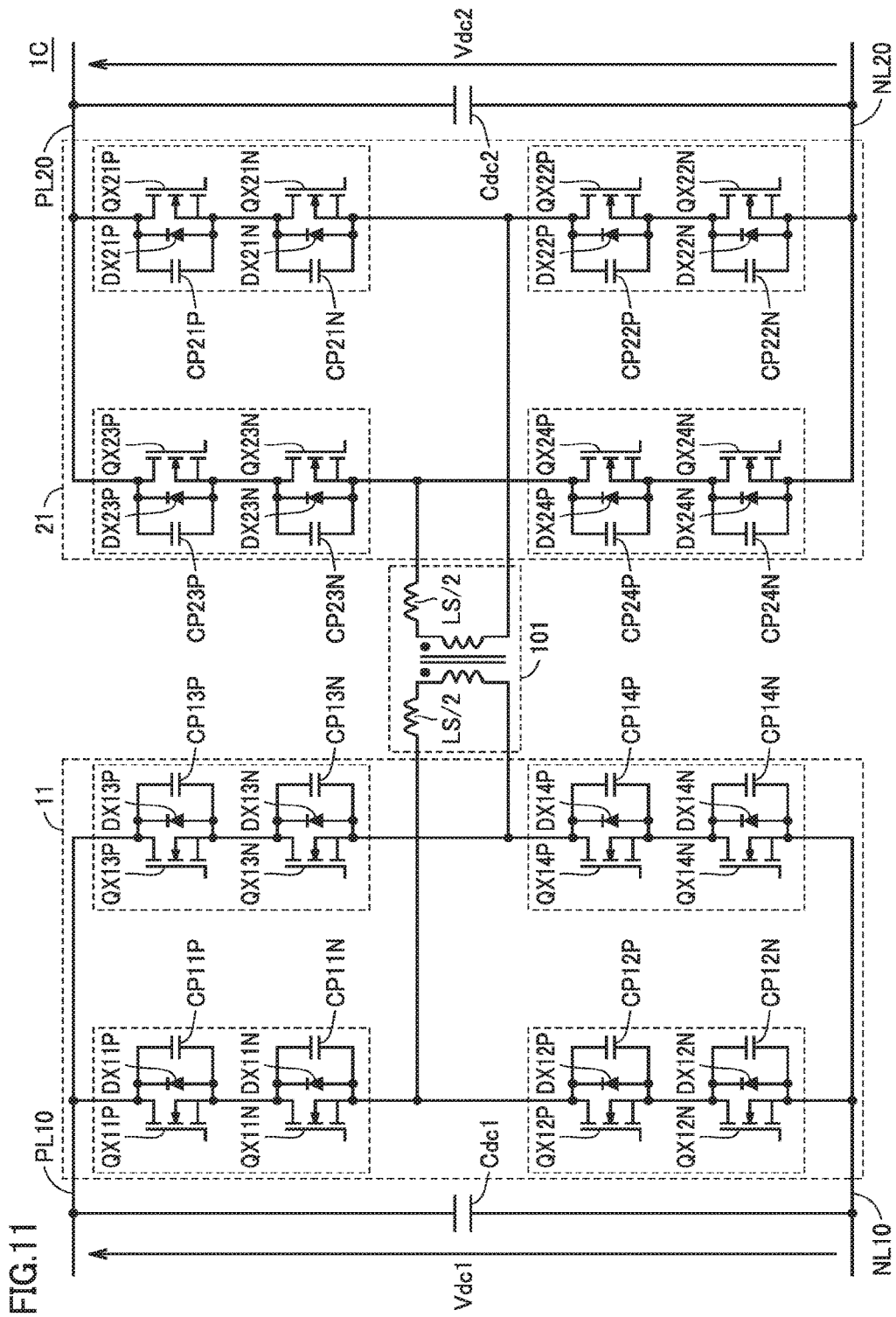
FIG. 11 is a diagram showing the main circuit configuration of a power conversion apparatus according to a fifth embodiment.

FIG. 11 is a diagram showing the main circuit configuration of a power conversion apparatus 1C according to a fifth embodiment. In the fifth embodiment, SiC-MOSFETs are employed in the bridge circuit. Power conversion apparatus 1C includes single-phase full-bridge circuits 11, 21 and a single-phase transformer 101.

That is, bridge circuit 11 in FIG. 11 includes switching devices QX11P, QX11N, QX12P, QX12N, QX13N, QX13P, QX14N, QX14P, QX21N, QX21P, QX22P, QX22N, QX23N, QX23P, QX24P, QX24N that are SiC-MOSFETs, instead of switching devices Q11P, Q11N, Q12P, Q12N, Q13N, Q13P, Q14N, Q14P, Q21N, Q21P, Q22P, Q22N, Q23N, Q23P, Q24P, Q24N that are IGBT devices, and includes freewheeling diodes DX11P, DX11N, DX12P, DX12N, DX13N, DX13P, DX14N, DX14P, DX21N, DX21P, DX22P, DX22N, DX23N, DX23P, DX24P, DX24N that are SiC-diodes, instead of freewheeling diodes D11P, D11N, D12P, D12N, D13N, D13P, D14N, D14P, D21N, D21P, D22P, D22N, D23N, D23P, D24P, D24N, in the configuration of bridge circuit 10 in FIG. 1. As the snubber capacitors connected in parallel with the switching devices, parasitic capacitances CP11P, CP11N, CP12P, CP12N, CP13P, CP13N, CP14P, CP14N, CP21P, CP21N, CP22P, CP22N, CP23P, CP23N, CP24P, CP24N of the switching devices are used.

In the first to fourth embodiments, IGBTs are used as switching devices. The parasitic capacitance of the IGBT is so small to be negligible, compared with the capacitance of the snubber capacitor connected in parallel. Therefore, the parasitic capacitance of IGBT is not sufficient for suppressing the voltage applied to the switching device when the turn-off timings differ to equal to or smaller than maximum voltage Vmax permitted by the switching device.

However, SiC-MOSFETs are commonly known to have parasitic capacitance larger than IGBTs. Then, in the fifth embodiment, each of a plurality of semiconductor switching devices is formed of SiC semiconductor having a wider bandgap than silicon. Each of a plurality of semiconductor switching devices has parasitic capacitance equivalent to the capacitance set such that the end-to-end voltage of the semiconductor switching device turning off earlier is suppressed to equal to or lower than a predetermined voltage at the time of turning off of the semiconductor switching device turning off later, assuming that variation in turn-off timing among the semiconductor switching devices is the maximum variation time. Assuming that the power conversion apparatus outputs electric power that is half or smaller than half the rated power, the capacitance is set such that the magnetic energy stored in inductance is larger than the electrostatic energy stored in parasitic capacitance in each arm during the dead time period.

In the fifth embodiment, the parasitic capacitance of the SiC-MOSFET is used as a snubber capacitor, whereby voltage applied to the switching device when the turn-off timings differ is suppressed to equal to or lower than maximum voltage Vmax without newly providing a snubber capacitor.

Sixth Embodiment

Figure 12:
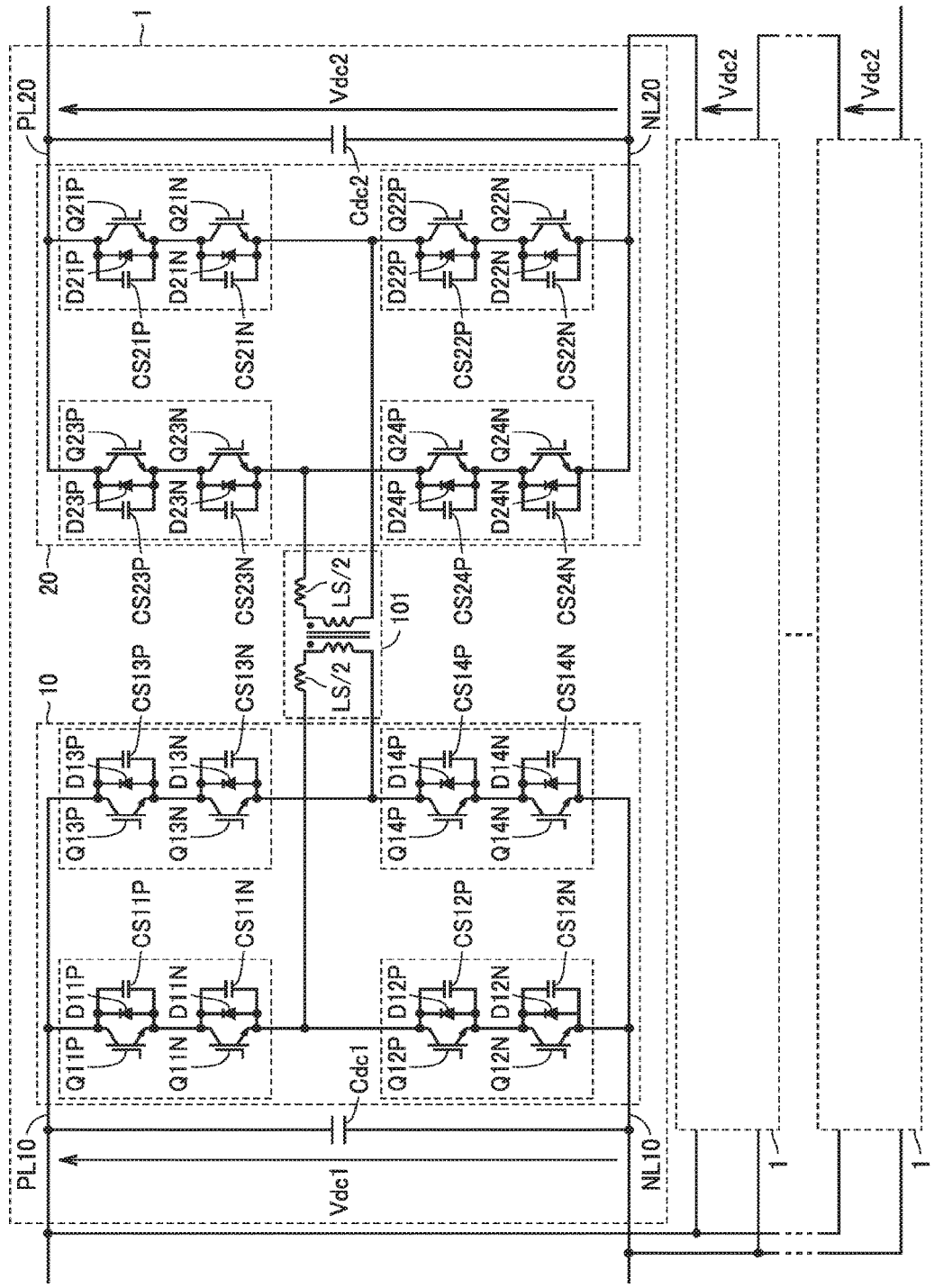
FIG. 12 is a diagram showing the main circuit configuration of a power conversion apparatus according to a sixth embodiment.

FIG. 12 is a diagram showing the overall configuration of the power conversion apparatus in a sixth embodiment of the present invention. In this sixth embodiment, as shown in FIG. 12, the power conversion apparatus of any one of the first to fifth embodiments is used as a unit cell, a plurality of unit cells are used, and the capacitor portions receiving DC voltage on the primary side and the secondary side are connected in parallel or in series.

More specifically, the power conversion apparatus according to the sixth embodiment includes the plurality of unit cells. The unit cells at least include a first unit cell and a second unit cell. Negative-electrode power supply line NL20 of second bridge circuit 20 in the first unit cell is connected with positive-electrode power supply line PL20 of second bridge circuit 20 in the second unit cell. The power supply lines on the second bridge circuit 21 side are thus connected in series. When there are n unit cells, in the configuration in FIG. 12, n capacitors Cdc1 of first bridge circuits 10 are connected in parallel, and input/output voltage is voltage Vdc1. On the other hand, n capacitors Cdc2 of second bridge circuits 20 are connected in series, and the input/output voltage is voltage Vdc2×n.

Although a single-phase full-bridge circuit is illustrated as a converter in the example of FIG. 12, a three-phase bridge circuit may be used as in the fourth embodiment.

Since the configuration as shown in FIG. 12 can be constructed in unit cells, the configurations shown in the first to fifth embodiments can be used and similar effects can be achieved.

In addition, in the section (bridge circuit 20 side) where unit cells are connected in series as in FIG. 12, a DC voltage higher than the configurations shown in the first to fifth embodiments can be handled, whereas in the section where unit cells are connected in parallel (bridge circuit 10 side), direct current larger than in the configurations shown in the first to fifth embodiments can be handled. That is, electric power of the power conversion apparatus can be increased. In the configuration in FIG. 12, the bridge circuit 10 side is parallel connection, and the bridge circuit 20 side is series connection. However, the parallel connection and the series connection may be reversed, or both sides may be parallel connection, or both sides may be series connection.

A plurality of unit cells configured equivalently can simplify testing and improve the productivity.

In the first to sixth embodiments, silicon steel is typically used for the iron core of the transformer. However, amorphous alloy or nanocrystalline alloy may be used. The use of amorphous alloy or nanocrystalline alloy leads to lower loss.

In the present invention, embodiments can be combined as desired or embodiments may be modified or omitted, if necessary, without departing from the scope of the invention.

The embodiment disclosed here should be understood as being illustrative rather than being limitative in all respects. The scope of the present invention is shown not in the foregoing description but in the claims, and it is intended that all modifications that come within the meaning and range of equivalence to the claims are embraced here.

REFERENCE SIGNS LIST 1, 1A, 1B power conversion apparatus, 10, 11, 20, 21 bridge circuit, 10A, 10B, 20A, 20B leg, 10LA, 10UA, 10UB, 20LA arm, 30 control circuit, 40 drive circuit, 101 transformer, 102 three-phase transformer, 110, 120 three-phase bridge circuit, Q11P, Q11N, Q12P, Q12N, Q13N, Q13P, Q14N, Q14P, Q15P, Q15N, Q16P, Q16N, Q21N, Q21P, Q22P, Q22N, Q23N, Q23P, Q24P, Q24N, Q25P, Q25N, Q26P, Q26N, QX11P, QX11N, QX12P, QX12N, QX13N, QX13P, QX14N, QX14P, QX21N, QX21P, QX22P, QX22N, QX23N, QX23P, QX24P, QX24N switching device, CS11P, CS11N, CS12N, CS12P, CS13P, CS13N, CS14N, CS14P, CS15P, CS15N, CS16P, CS16N, CS21P, CS21N, CS22P, CS22N, CS23N, CS23P, CS24P, CS24N, CS25P, CS25N, CS26P, CS26N snubber capacitor, Cdc1, Cdc2 capacitor, D11P, D11N, D12N, D12P, D13P, D13N, D14P, D14N, D15P, D15N, D16P, D16N, D21N, D21P, D22N, D22P, D23N, D23P, D24P, D24N, D25P, D25N, D26P, D26N, DX11P, DX11N, DX12P, DX12N, DX13N, DX13P, DX14N, DX14P, DX21N, DX21P, DX22P, DX22N, DX23N, DX23P, DX24P, DX24N freewheeling diode, PL10, NL10, PL20, NL20 power supply line, CP11P, CP11N, CP12P, CP12N, CP13P, CP13N, CP14P, CP14N, CP21P, CP21N, CP22P, CP22N, CP23P, CP23N, CP24P, CP24N parasitic capacitance.

The invention claimed is:

1. A power conversion apparatus configured to perform electric power conversion between a first DC power and a second DC power, the power conversion apparatus comprising:
a first bridge circuit on the first DC power side;
a second bridge circuit on the second DC power side; and
a transformer having a primary-side winding connected to the first bridge circuit and a secondary-side wiring connected to the second bridge circuit,
each of the first bridge circuit and the second bridge circuit including
a first leg and a second leg connected between a positive-electrode power supply line and a negative-electrode power supply line,
each of the first leg and the second leg including
an upper arm and a lower arm connected in series between the positive-electrode power supply line and the negative-electrode power supply line,
each of the upper arm and the lower arm including
a plurality of semiconductor switching devices connected in series and
a plurality of snubber capacitors respectively connected in parallel with the semiconductor switching devices,
the power conversion apparatus further comprising:
an inductance element disposed in a current path from the first leg of the first bridge circuit to the second leg of the first bridge circuit through the primary-side wiring; and
a controller to control the bridge circuit corresponding to the first leg and the second leg such that a dead time period is provided between a turn-on period of the upper arm and a turn-on period of the lower arm included in the first leg and between a turn-on period of the upper arm and a turn-on period of the lower arm included in the second leg,
wherein a value of the inductance element is determined such that a time taken for a current polarity of the inductance element to be reversed from start of the dead time period is longer than the dead time period, and a combined capacitance value of the snubber capacitors in each of the upper arm and the lower arm is determined such that magnetic energy stored in the inductance element is larger than electrostatic energy stored in combined capacitance of the snubber capacitors during the dead time period.

2. The power conversion apparatus according to claim 1, wherein when it is assumed that the power conversion apparatus outputs half a rated power, the value of the inductance element is determined such that a time taken for a polarity of current flowing through the primary-side winding to be reversed from start of the dead time period is longer than the dead time period.

3. The power conversion apparatus according to claim 1, wherein
the first bridge circuit configures a single-phase full-bridge circuit,
the inductance has a value within a range of $$LS \geq [(2-Vdc1 \cdot Vdc2)/P] \cdot TD, \text{ and}$$

combined capacitance of the snubber capacitors in each arm included in the first bridge circuit has a value within a range of $$CS \leq [LS/(4 \cdot Vdc1 \cdot Vdc2)] \cdot \{[(Vdc1+Vdc2)/LS] \cdot TD\}^2$$

where LS denotes the value of the inductance element, Vdc1 denotes a voltage between the positive-electrode power supply line and the negative-electrode power supply line of the first bridge circuit, Vdc2 denotes a voltage between the positive-electrode power supply line and the negative-electrode power supply line of the second bridge circuit, P denotes electric power that is half a rated power of transmitted power of the power conversion apparatus or smaller than half the rated power, CS denotes the combined capacitance value of the snubber capacitors, and TD denotes the dead time period.

4. The power conversion apparatus according to claim 1, wherein
the first bridge circuit further includes a third leg and configures a three-phase bridge circuit,
the inductance has a value within a range of $$LS \geq (4/3) \cdot [(Vdc1 \cdot Vdc2)/P] \cdot TD$$

combined capacitance of the snubber capacitors in each arm included in the first bridge circuit has a value within a range of $$CS \leq [LS/(4 \cdot Vdc1 \cdot Vdc2)] \cdot \{([(Vdc1+Vdc2)/(3LS)] \cdot TD\}^2$$

where LS denotes the value of the inductance element, Vdc1 denotes a voltage between the positive-electrode power supply line and the negative-electrode power supply line of the first bridge circuit, Vdc2 denotes a voltage between the positive-electrode power supply line and the negative-electrode power supply line of the second bridge circuit, P denotes electric power that is half a rated power of transmitted power of the power conversion apparatus or smaller than half the rated power, CS denotes the combined capacitance value of the snubber capacitors, and TD denotes the dead time period.

5. The power conversion apparatus according to claim 1, wherein the snubber capacitors have capacitance set such that end-to-end voltage of a semiconductor switching device turning off earlier is suppressed to equal to or lower than a predetermined voltage at a point of time of turning off of a semiconductor switching device turning off later when it is assumed that the power conversion apparatus outputs a rated power and variation in turn-off timing among semiconductor switching devices connected in series in the upper arm or the lower arm is a maximum variation time.

6. The power conversion apparatus according to claim 1, wherein
the snubber capacitors have capacitance set such that end-to-end voltage of a semiconductor switching device turning off earlier is suppressed to equal to or lower than a predetermined voltage at a time of turning off of a semiconductor switching device turning off later when it is assumed that the power conversion apparatus outputs rated power and variation in turn-off timing among semiconductor switching devices connected in series between the upper arm or the lower arm is a maximum variation time, and when it is assumed that the power conversion apparatus outputs electric power that is half a rated power or smaller than half the rated power, magnetic energy stored in the inductance element is larger than electrostatic energy stored in combined capacitance of the snubber capacitors in the first bridge circuit during the dead time period.

7. The power conversion apparatus according to claim 1, wherein the first bridge circuit configures a single-phase full-bridge circuit, the inductance has a value within a range of $$LS \geq [(2 \cdot Vdc1 \cdot Vdc2)/P] \cdot TD$$

combined capacitance of the snubber capacitors in each arm included in the first bridge circuit has a value within a range of $$CS \leq [LS/(4 \cdot Vdc1 \cdot Vdc2)] \cdot [(Vdc1+Vdc2)/LS \cdot TD]^2, \text{ and}$$

capacitance of each of the snubber capacitors in each arm has a value within a range of $$CS' \geq [Vmax - Vdc1/2]^{-1} \cdot \Delta T \cdot (2/3) \cdot [(Vdc1+Vdc2)/LS] \cdot TD$$

where LS denotes the value of the inductance element, Vdc1 denotes a voltage between the positive-electrode power supply line and the negative-electrode power supply line of the first bridge circuit, Vdc2 denotes a voltage between the positive-electrode power supply line and the negative-electrode power supply line of the second bridge circuit, P denotes electric power that is half a rated power of transmitted power of the power conversion apparatus or smaller than half the rated power, CS denotes the combined capacitance value of the snubber capacitors, CS' denotes the capacitance value of each individual snubber capacitor, TD denotes a dead time period, Vmax is a maximum voltage permitted by the semiconductor switching device, and ΔT denotes a maximum variation time at a time of turning off of the switching device.

8. The power conversion apparatus according to claim 1, wherein the first bridge circuit further includes a third leg and configures a three-phase bridge circuit, the inductance has a value within a range of $$LS \geq (4/3) \cdot [(Vdc1 \cdot Vdc2)/P] \cdot TD$$

combined capacitance of the snubber capacitors in each arm included in the first bridge circuit has a value within a range of $$CS \leq [LS(4 \cdot Vdc1 \cdot Vdc2)] \cdot \{[(Vdc1+Vdc2)/(3LS)] \cdot TD\}^2,$$
and capacitance of each of the snubber capacitors in each arm has a value within a range of $$CS' \geq [Vmax - Vdc1/2]^{-1} \cdot \Delta T(2/3) \cdot [(Vdc1+Vdc2)/(3LS)] \cdot TD$$

where LS denotes the value of the inductance element, Vdc1 denotes a voltage between the positive-electrode power supply line and the negative-electrode power supply line of the first bridge circuit, Vdc2 denotes a voltage between the positive-electrode power supply line and the negative-electrode power supply line of the second bridge circuit, P denotes electric power that is half a rated power of transmitted power of the power conversion apparatus or smaller than half the rated power, CS denotes the combined capacitance value of the snubber capacitors, TD denotes the dead time period, and CS' denotes the capacitance value of each individual snubber capacitor.

9. The power conversion apparatus according to claim 1, wherein each of the snubber capacitors has a series inductance, and when the snubber capacitor corresponding to the series inductance discharges from a state of being charged to a predetermined maximum voltage permitted by the semiconductor switching device corresponding to the series inductance, a value of the series inductance is set to a value that suppresses discharge current of the corresponding snubber capacitor to equal to or smaller than maximum current permitted by the corresponding semiconductor switching device.

10. The power conversion apparatus according to claim 1, wherein each of the snubber capacitors has a series inductance, and a value of the series inductance at least includes a value of parasitic inductance present in each of the snubber capacitor, the semiconductor switching device, and a connection conductor connecting the semiconductor switching device with the snubber capacitor.

11. The power conversion apparatus according to claim 10, wherein each of the snubber capacitors includes a capacitor portion and an inductor portion connected in series with the capacitor portion, and a value of the series inductance is determined by a value of the parasitic inductance and a value of inductance of the inductor portion.

12. The power conversion apparatus according to claim 1, wherein each of the snubber capacitors has a series inductance, and the series inductance has a value within a range of $$LP \geq CS'(Vmax/Imax)^2$$

where LP denotes the value of the series inductance, CS' denotes a capacitance value of each individual snubber capacitor, Vmax denotes maximum end-to-end voltage permitted by the semiconductor switching device, and Imax denotes a maximum current value permitted by the semiconductor switching device.

13. The power conversion apparatus according to claim 5, further comprising a drive circuit to apply a drive voltage to the semiconductor switching devices in the first and second bridge circuits, wherein the maximum variation time is a maximum value of variation in response time due to individual difference of a component in the drive circuit.

14. The power conversion apparatus according to claim 1, further comprising a drive circuit to apply a drive voltage to the semiconductor switching devices in the first and second bridge circuits, wherein the drive circuit is configured to apply a drive voltage simultaneously to a plurality of semiconductor switching devices disposed in series in the same arm.

15. The power conversion apparatus according to claim 1, wherein each of the semiconductor switching devices is formed with SiC semiconductor having a wider bandgap than silicon, when it is assumed that variation in turn-off timing among the semiconductor switching devices is a maximum variation time, each of the semiconductor switching devices includes a parasitic capacitance equivalent to capacitance set such that end-to-end voltage of a semiconductor switching device turning off earlier is suppressed to equal to or lower than a predetermined voltage at a time of turning off of a semiconductor switching device turning off later, and when it is assumed that the power conversion apparatus outputs electric power that is half a rated power or smaller than half, each of the semiconductor switching devices has parasitic capacitance such that magnetic energy stored in the inductance is larger than electrostatic energy stored in the parasitic capacitance in each arm during the dead time period.

16. A power conversion apparatus comprising a plurality of unit cells, each of the unit cells being the power conversion apparatus of claim 1, the unit cells including a first unit cell and a second unit cell, wherein the negative-electrode power supply line of the second bridge circuit in the first unit cell is connected with the positive-electrode power supply line of the second bridge circuit in the second unit cell.

* * * * *

UNITED STATES PATENT AND TRADEMARK OFFICE
CERTIFICATE OF CORRECTION

PATENT NO. : 10,432,101 B2
APPLICATION NO. : 16/307103
DATED : October 1, 2019
INVENTOR(S) : Takaharu Ishibashi et al.

Page 1 of 1

It is certified that error appears in the above-identified patent and that said Letters Patent is hereby corrected as shown below:

In the Specification

In Column 7, Line 39, delete "co" and insert --ω--, therefor.

In Column 7, Lines 41-42 (1), delete "(Vdc1-Vdc2)" and insert --(Vdc1·Vdc2)--, therefor.

In Column 9, Lines 21-22 (2), delete "(Vdc1-Vdc2)" and insert --(Vdc1·Vdc2)--, therefor.

In Column 9, Lines 26-27 (3), delete "(Vdc1-Vdc2)" and insert --(Vdc1·Vdc2)--, therefor.

In Column 9, Line 55, delete "Vcd1" and insert --Vdc1--, therefor.

In Column 15, Lines 35-36 (8), delete "(Vmax/$T$max)$^2$" and insert --(Vmax/Imax)$^2$--, therefor.

In Column 17, Lines 8-9 (9), delete "(Vdc1+Vdc2)" and insert --(Vdc1·Vdc2)--, therefor.

In the Claims

In Column 22, Lines 9-10, delete "(2-Vdc1·Vdc2)" and insert --(2·Vdc1·Vdc2)--, therefor.

Signed and Sealed this
Second Day of June, 2020

Andrei Iancu
*Director of the United States Patent and Trademark Office*